US008832123B2

(12) United States Patent
Plattner et al.

(10) Patent No.: US 8,832,123 B2
(45) Date of Patent: Sep. 9, 2014

(54) FILTER METHOD FOR A CONTAINMENT-AWARE DISCOVERY SERVICE

(75) Inventors: Hasso Plattner, Schriesheim (DE); Alexander Zeier, Berlin (DE); Mueller Juergen, Potsdam (DE)

(73) Assignee: Hasso-Plattner-Institut für Softwaresystemtechnik GmbH, Potsdam (DE)

( * ) Notice: Subject to any disclaimer, the term of this patent is extended or adjusted under 35 U.S.C. 154(b) by 0 days.

(21) Appl. No.: 13/338,688

(22) Filed: Dec. 28, 2011

(65) Prior Publication Data

US 2013/0007024 A1 Jan. 3, 2013

Related U.S. Application Data

(60) Provisional application No. 61/427,506, filed on Dec. 28, 2010.

(30) Foreign Application Priority Data

Dec. 28, 2010 (EP) .................................... 10197198

(51) Int. Cl.
G06F 17/30 (2006.01)
G06Q 10/08 (2012.01)
G06F 15/16 (2006.01)

(52) U.S. Cl.
CPC .................................... *G06Q 10/08* (2013.01)
USPC .......................................... 707/752; 707/769

(58) Field of Classification Search
USPC ........................................................ 707/754
See application file for complete search history.

(56) References Cited

U.S. PATENT DOCUMENTS

| 8,756,686 B2 | 6/2014 | Plattner |
| 2002/0178026 A1 | 11/2002 | Robertson et al. |
| 2006/0080428 A1 | 4/2006 | Trossen et al. |
| 2007/0250545 A1* | 10/2007 | Surlaker et al. ............... 707/201 |
| 2007/0282928 A1* | 12/2007 | Jiao et al. ...................... 707/204 |
| 2008/0120725 A1 | 5/2008 | Asher et al. |
| 2011/0055218 A1 | 3/2011 | Capuozzo et al. |
| 2012/0078937 A1 | 3/2012 | Hall |
| 2012/0084135 A1 | 4/2012 | Nissan et al. |
| 2013/0006989 A1 | 1/2013 | Plattner et al. |
| 2013/0007847 A1 | 1/2013 | Plattner et al. |

OTHER PUBLICATIONS

Muller, Jurgen et al., "An Aggregating Discovery Service for the EPCglobal Network," IEEE, Proceedings fo the 43rd Hawaii International Conference on System Sciences, 2010, 10 pages.

Harrison, Mark, White Paper—EPC Information Service—Data Model and Queries, Auto-ID Center Institute for Manufacturing, University of Cambridge, Mill Lane, Cambridge, CB2 1RX, United Kingdom, Published Oct. 1, 2003, 21 pages, http://www.autoidlabs.org/whitepapers/cam-autoid-wh025.pdf.

(Continued)

*Primary Examiner* — Alex Gofman
(74) *Attorney, Agent, or Firm* — Fountainhead Law Group, P.C.

(57) ABSTRACT

In general, methods and apparatus, including computer program products, implementing and using techniques for providing a discovery service in a unique identifier network are described. Said discovery service is suitable for tracking and tracing a query item represented by a unique identifier in a unique identifier network. In particular, a filter method for a containment-aware discovery service is described.

5 Claims, 8 Drawing Sheets

(56) References Cited

OTHER PUBLICATIONS

EPCglobal—EPC Information Services (EPCIS) Version 1.0 Specification, Ratified Standard, Apr. 12, 2007, 144 pages, http://www.gsl.org/gsmp/kc/epcglobal/epcis/epcis_1_0-standard-20070412.pdf.
EPCglobal—The EPCglobal Architecture Framework, EPCglobal Final Version 1.4, Approved Dec. 15, 2010, 76 pages, http://www.gsl.org/gsmp/kc/ipcglobal/architecture/architecture_1_4-framework-20101215.pdf.
Extended European Search Report dated Jul. 1, 2011, European Patent Application No. 10197198.4-1238.
Nonfinal Office Action mailed Apr. 25, 2013 from U.S. Appl. No. 13/338,679.
Gerke, Kerstin et al., "Process Mining of RFID-Based Supply Chains," 2009 IEEE Conference on Commerce and Enterprise Computing, IEEE, Piscataway, NJ, Jul. 20, 2009, pp. 285-292.
Guijarro, Miguel Angel et al., "Working Prototype of a Serial-Level Lookup Service," Internet Citation, Feb. 1, 2008, pp. 1-125, retrieved from URL:http://www.bridge-project.eu/data/File/BRIDGE_WP02_Prototype_Serial_level_lookup_service.pdf (retrieved on May 23, 2011).
Rezafard, A., "Extensible Supply-Chain Discovery Service Problem Statement, draft-rezafard-esds-problem-statement-03.text," Internet Draft, Internet Engineering Task Force (IETF); Standardworkingdraft, Internet Society (ISOC) 4, Rue des Falaise CH, Geneva, Switzerland, No. 3, Nov. 17, 2008, 35 pages.
Cantero, J.J. et al., "Traceability Applications Based on Discovery Services," IEEE International Conference on Emerging Technologies and Factory Automation, 2008, Piscataway, NJ, Sep. 15, 2008, pp. 1332-1337.
University of Cambridge et al, "High Level Design for Discovery Services," Internet Citation, Aug. 15, 2007, pp. 1-112, retrieved from URL:http://www.bridge-project.ed/data/File/BRIDGE%20WP02%20High%20level%20design%20Discovery%20Services.pdf. (retrieved on May 23, 2011).
Lee, Gyeongtaek et al, "Discovery Architecture for the Tracing of Products in the EPCglobal Network," 2008 IEEE/IFIP International Conference on Embedded and Ubiquitous Computing, Piscataway, NJ, Dec. 17, 2008, pp. 553-558.
First Examination Report dated Apr. 3, 2013, European Patent Application No. 10197198.4.
First Examination Report dated Apr. 3, 2013, European Patent Application No. 10197197.6.
First Examination Report dated Apr. 3, 2013, European Patent Application No. 10197199.2.
Nonfinal Office Action mailed Sep. 9, 2013 from U.S. Appl. No. 13/388,670.
Extended European Search Report dated Jul. 4, 2011, European Patent Application No. 10197199.2-1238.
Final Office Action mailed Jan. 10, 2014 from U.S. Appl. No. 13/338,679.
Notice of Allowance mailed Feb. 13, 2014 from U.S. Appl. No. 13/338,670.
Notice of Allowance mailed Jun. 11, 2014 from U.S. Appl. No. 13/338,679, 9 pages.

* cited by examiner

FILTER METHOD FOR A CONTAINMENT-AWARE DISCOVERY SERVICE

CROSS-REFERENCE TO RELATED APPLICATIONS

The present application claims priority to U.S. Provisional App. No. 61/427,506 for "A Containment-Aware Discovery Service" filed Dec. 28, 2010, and to European Patent App. No. 10 197 198.4 for "A Filter Method for a Containment-Aware Discovery Service" filed Dec. 28, 2010, which are incorporated herein by reference.

TECHNICAL FIELD

In general, the invention provides methods and apparatus, including computer program products, implementing and using techniques for providing a discovery service in a unique identifier network. Said discovery service is suitable for tracking and tracing a query item represented by a unique identifier in a unique identifier network.

BACKGROUND

Discovery services find use in a wide range of applications and environments. For example, discovery services may be used to locate printers, websites, and web services that have been made publicly available in a network. However, in certain networks it may be desirable to provide some degree of anonymity and authentication for various reasons. An example for such a network is a unique identifier network deployed in a supply chain spanning over one or more companies.

Unique identifier networks rely on unique identifier technologies, such as unique identifier tags and unique identifier coding schemes, and allow for countless applications, such as item tracking, item tracing, item authentication, or item supply chain analysis. Examples for unique identifier tags are radio frequency identification (RFID) tags and two-dimensional barcodes. Unique identifier tags provide the basis for tagging physical objects (herein referred to as 'items') with unique identifiers that are encoded using unique identifier coding schemes. From the time an item was tagged/assigned with a unique identifier, the unique identifier represents the item in a unique identifier network. Examples for the above-mentioned unique identifier coding schemes are the Electronic Product Code (EPC) coding scheme and the Unique Consignment Reference (UCR) coding scheme. The EPC coding scheme is designed to meet the needs of various industries, while guaranteeing uniqueness for all EPC-compliant unique identifier tags. The UCR coding scheme was defined by the World Customs Organization for providing a traceable identifying number for an international movement of goods.

The above described unique identifier technologies provide the basis for unique identifier networks that gather, store, and provide data about items comprising a unique identifier tag as they move through supply chains. Every time a unique identifier is read, a piece of data is generated (from hereon referred to as an 'event'). Each event may be stored on an event server, which is typically located at the site of a custodian that generated said event. A custodian may be a company, such as a manufacturer, a wholesaler, a distributor, a retailer or even a maintenance service. An item may be any physical object, such as raw materials, parts and finished goods as well as containers used to transport other items around the world. However, an item may also refer any non-physical object that may be represented by a unique identifier in a unique identifier network.

In order to understand and/or optimize a supply chain, the stored data, i.e. the stored events, may be analyzed by tracking and tracing one or multiple items represented by a unique identifier each. Thereby, information may be extracted that is related to usage, dwell time, down time, mean-time-between-failure and inventory. Such information may assist those directly involved in supply chains, for example: manufacturers, distributors, transportation service providers and retailers. In many cases, authorities and governing bodies also value and require access to this information, for example: port authorities, customs and excise agencies, and import/export and border control.

Discovery services are envisaged to provide according track and trace information (also referred to as trip information) regarding items tagged with a unique identifier tag. For example, according discovery services, upon request from a client, may retrieve all events relevant to a query item, which were generated throughout the lifecycle of the query item. Thereby, the discovery service deals with a variety of technical problems and issues, some of them are presented in the following:

A first technical problem is based on the fact that each custodian typically stores all events that it generated on its own, local event server. Often, the query item is shipped from one custodian to another and thus events relevant for the query item may be spread out on a plurality of different event servers located at their corresponding custodians. Accordingly, the discovery service should be able to identify and find all events relevant to the query item.

The first technical problem is further complicated by the fact that containers, such as pallets, totes and boxes, are used throughout supply chains to aggregate items for transportation. Though containers are also items as defined above and may comprise unique identifier tags storing a unique identifier, the query item may move "hidden" in a container through the supply chain. The query item may even be contained in a first container, which in turn may be contained in a second container. Such higher degrees/levels of packing are referred to as packing hierarchy. Accordingly, the discovery service should also be able to identify and find all events that are relevant to a container containing the query item.

A second technical problem arises from the fact that data ownership for custodians must be observed. Though many advantages such as track and trace based applications arise from unique identifier networks and discovery services, the information that custodians are storing on their event servers may be classified. Business secrets could be easily disclosed by data mining approaches if data ownership and proper authentication procedures are not properly implemented. Accordingly, the discovery service and the unique identifier network should provide custodians with full control over their business data, events, event server addresses, and event server authentication settings.

The second technical problem is further complicated by the fact that containers, unlike retail goods, are repeatedly used and may circulate in a supply chain for several years. Such containers are referred to as reusable transport items (RTI). During their lifetime, containers may be used by different, competitive businesses. Accordingly, the discovery service should be able to distinguish between trips of a container that are relevant for the query item and trips that are not relevant for the query item.

A third technical problem arises from the fact that a discovery service should provide track and trace information in fast and resource efficient manner. A client, such as a customer querying track and trace information regarding a prescription medicinal drug just bought, may not be willing to wait longer than a few seconds for the result of the query.

The present invention addresses those and other technical problems arising in a unique identifier network, which certainly are common to many discovery services in other environments and applications.

I. SUMMARY

In general, the invention provides methods and apparatus, including computer program products, implementing and using techniques for providing a discovery service in a unique identifier network. Said discovery service is suitable for tracking and tracing a query item represented by a unique identifier in a unique identifier network.

I.1. Communication Protocol Method

In a first aspect, the invention relates to a communication protocol method for tracking and tracing a query item represented by a unique identifier in unique identifier network, using a discovery service. According to this aspect, the discovery service comprises a discovery service database for storing event notifications. The discovery service receives event notifications from event servers, wherein each event notification comprises an event server address to the event server comprising the corresponding event. The discovery service then stores the received event notifications in the discovery service database. Upon receiving an item query from a client, wherein the item query includes a unique identifier of the query item, the discovery service identifies from the stored event notifications a filtered set of event notifications relevant for the query item. Accordingly, for identifying the filtered set of event notifications relevant for the query item, the discovery service only analyzes the event notifications stored in the discovery service database and does not request additional information from, for example, one or more event servers. Herein, client refers to a machine for submitting a query item to the discovery service.

In an embodiment of the first aspect, the communication protocol method further comprises the step of determining from the filtered set of event notifications relevant for the query item: relevant events corresponding to the relevant event notifications; and relevant event server addresses of relevant event servers, wherein each event server storing one or more relevant events is a relevant event server.

In an embodiment of the first aspect, the communication protocol method comprises further steps (following the step of identifying all event notifications relevant for the query item and the step of determining relevant events and relevant event server addresses): submitting event queries for the relevant events to the relevant event servers in parallel, wherein each event server storing one or more relevant events is a relevant event server; receiving the relevant events from the relevant event servers; aggregating the relevant events; and submitting the relevant events to the client in an aggregated form. 'In parallel' in this context means that all event queries are submitted substantially at once. For example, the discovery service does not wait for a response from one relevant event server before the discovery service submits an event query to another relevant event server. When the discovery service has submitted the event queries, the relevant event servers receive and process said event queries. Typically the relevant event servers submit all relevant events to the discovery service. However, the discovery service may have to deal with alternative scenarios: In a first scenario, a relevant event server does not respond. The discovery service will wait for a certain amount of time and—if the response from the event server is still missing—either provide the client with an incomplete response indicating that it is incomplete or provide the client with an error message indicating that tracking and tracing could not be completed. In a second scenario, the item query lacks an authentication certificate required for accessing requested relevant events. In this case, one or more relevant event servers may deny event queries by submitting an error message to the discovery service or by not responding to the discovery service. The discovery service may then either provide the client with an incomplete item query response indicating that it is incomplete or provide the client with an error message indicating that the search could not be completed.

In an embodiment of the first aspect, each event notification is either an aggregation event notification or an object event notification. Aggregation event notifications relate to aggregation events and object event notifications relate to object events. An aggregation event indicates that the containment hierarchy has changed. Either an entity (such as the query item, any other container, or a container) was packed into a container (action=addition) or unpacked from a container (action=deletion). Within the context of such an aggregation event, the entity that is packed into the container is referred to as child and the container is referred to as parent. The unique identifier of the child is referred to as child identifier. The unique identifier of the parent is referred to as the parent identifier. Object events are events that are not aggregation events. Typically, an object event and an object event notification is generated each time an entity was, for example, moved, shipped, produced, processed, manufactured, distributed, used, repaired or maintained, disposed or recycled. An aggregation event and an aggregation event notification is generated each time an entity is added into a container or deleted from a container. Each aggregation event notification comprises an event server address and at least one of the following elements: an action, a timestamp, a parent identifier, and a child identifier. Further, each object event notification comprises an event server address and at least one of the following elements: a timestamp and an object identifier.

Stored event notifications and received event notifications may not comprise the same data format. In particular, the discovery service may extract only specific information from received event notifications and accordingly converts received event notifications into stored event notifications. Some examples are described in the following: In a first example, the received event notification comprises a timestamp corresponding to the time when the corresponding actual event was generated. The stored event notification only comprises an ID that sorts the stored event notifications according to the time their corresponding events were generated. In a second example, a received event notification relate to multiple events, such as the unpacking of multiple entities from a container, while stored event notifications only relates to single events, such as unpacking of each item from a container individually. In this case, a single received event notification is converted into one or more stored event notifications by the discovery service. In a third example, the received aggregation event notification comprises an action indicating whether the received aggregation event notification relates to an addition or a deletion, while the stored aggregation event notification does not comprise an action. The action of the stored aggregation event notification is, however, inferred from the history of the entities involved in the stored aggregation event notification. In case it is known that item A was contained in container B before an aggregation event notification comprising item A as a child identifier and container B as a parent identifier is generated/received, it is clear and inferred that said aggregation event notification must be a deletion aggregation event notification.

According to this embodiment of the first aspect, the event notifications relevant for the query item consist of: each object event notification having the unique identifier of either the query item or a container containing the query item as an object identifier; and each aggregation event notification having the unique identifier of either the query item or a container containing the query item as a child identifier. A container containing the query item in this context refers to a container containing the query item at the time of event generation. For example, when a container containing the query item is sent off from custodian 1, one object event is generated having the container containing the query item as an object identifier. However, when the query item is unpacked from a container containing the query item first and, subsequently, said container is sent off from custodian 1, two events are generated: one aggregation event having the query item as a child identifier and one object event having merely the container as object identifier—the latter object event does not have a container containing the query item as an object identifier. Further, one container 'contains the query item' independent of the containment hierarchy. In other words, for the one container to 'contain the query item', the one container either contains the query item directly or the one container contains a container containing the query item (and so forth).

In an embodiment of the first aspect, for identifying event notifications relevant for an query item, a technique referred to as 'inference' is applied: the path of a query item contained in one or more containers may be followed by tracking and tracing the outermost container and inferring track and trace information on the query item. Thereto, the discovery service analyzes each aggregation event notification wherein the query item or a container containing the query item is either the child or the parent. This way, the discovery service analyzes the respective containment hierarchies. The motivation for the inference technique is the fact that, in praxis, the query item may have been aggregated and disaggregated countless times during its lifecycle. For example, in a unique identifier network, the query item with unique identifier 1 is produced and, together with other items, aggregated to a box that is equipped with unique identifier 2. This box is then shipped to a distributer. The distributor forwards the box to a retailer, merely scanning identifier 2 without scanning identifier 1 because it is hidden in the box identified by identifier 2. At the retailer, the box is disaggregated and identifier 1 is read. Each time the box is packed or unpacked, an aggregation event is generated and a corresponding aggregation event notification is sent to a discovery service. When a client queries the discovery service for track and trace information regarding identifier 1, the discovery service using inference will detect that identifier 1 has been at the distributor by analyzing the containment hierarchies based on the above described aggregation events.

In an embodiment of the first aspect, wherein each event notification entry stored in the discovery service database comprises a time stamp, and wherein the step of identifying employs a search method and/or a filter method.

In an embodiment of the first aspect, the discovery service database is a main memory database relying on main memory for data storage, i.e. event storage. The main memory database is fast because the internal optimization algorithms are simple and execute only few instructions. Further, accessing data in main memory provides faster and more predictable performance than disk.

In an embodiment of the first aspect, the discovery service database is a disk database relying on a disk storage mechanism.

In an embodiment of the first aspect, each event notification entry stored in the discovery service database comprises: a timestamp; an identifier; a parent identifier; an event server address; and a timestamp. The identifier is either an object identifier for object event notifications or a child identifier for aggregation event notifications. For an object event notification, the parent identifier is zero. The timestamp may assume the format of an integer ID, wherein older timestamps comprise a lower integer ID than newer timestamps or vice versa.

In an embodiment of the first aspect, each event server comprises an event database for storing events, a communication interface for submitting event notifications to the discovery service, and for receiving event queries from the discovery service, and for submitting events to the discovery service.

In an embodiment of the first aspect, each event server further comprises an access controller for performing access control for each event query received from the discovery service.

In an embodiment of the first aspect, the item query comprises an authentication certificate, wherein each event query includes the authentication certificate of the corresponding item query, and wherein access control for the event queries is performed by the access controllers of the event servers on the basis of the authentication certificate.

In an embodiment of the first aspect, the item query comprises an authentication certificate, wherein access control for the event queries is performed by the discovery service on the basis of the authentication certificate.

In an embodiment of the first aspect, the discovery service stores item query information regarding each item query. Said item query information may contain a timestamp, which indicates the time that the item query was received by the discovery service, an address of the client that submitted the item query, the unique identifier representing the query item, and, optionally, the event notifications relevant to the unique identifier representing the query item, which were identified by the discovery service. Thereby, fore example, abuse of the discovery service may be recorded and/or traced back to a specific client.

In an embodiment of the first aspect, the event notifications relate to events, such as packing, unpacking, moving, shipping, producing, assembling, disassembling, processing, manufacturing, distributing, using, repairing and maintaining, disposing or recycling.

In an embodiment of the first aspect, an assembly containing the query item is considered a container containing the query item, wherein the assembly is represented by a unique identifier in a unique identifier network. For example, in case the query item is a part of a turbine, the turbine is regarded as a container containing the query item, wherein the turbine can be represented by a unique identifier in a unique identifier network. This way, if—after assembly of the turbine—it is discovered that the query item contained by the turbine comprises a defect, the discovery service allows for tracing the defect query item to the turbine that contains the defect query item.

In an embodiment of the first aspect, the unique identifiers are electronic product codes and the event servers are electronic product code information service servers.

In an embodiment of the first aspect, the unique identifiers of items are serialized global trade item number for uniquely identifying physical objects, wherein the unique identifiers of containers are serial shipping container codes for uniquely identifying shipping units.

In a second aspect, the invention relates to a system for running a discovery service for tracking and tracing a query item represented by a unique identifier in a unique identifier network, wherein the system comprises: an event server communication interface for receiving events and event notifications from event servers, wherein each event notification comprises an event server address; a query interface for receiving an item query, wherein a unique identifier representing the query item in the unique identifier network is included in the item query; and an application logic comprising: a persistency manager for storing and retrieving the event notifications in a discovery service database; and a containment solver for identifying all relevant events from the stored event notifications, and for determining, from the filtered set, relevant events and relevant event server addresses of relevant event servers, wherein each event server storing one or more relevant events is a relevant event server.

In an embodiment of the second aspect, the application logic further comprises: a response query aggregator for submitting event queries for the relevant events to the corresponding event servers in parallel, and for receiving the relevant events from the relevant event servers, and for aggregating the relevant events, wherein the query interface is suitable for submitting the relevant events to the client in an aggregated form.

In an embodiment of the second aspect, the system further comprises: a capture interface for extracting information from the received event notifications.

In an embodiment of the second aspect, the application logic further comprises: an index for indexing the event notifications stored in the discovery service database.

In an embodiment of the second aspect, the discovery service database is a main memory database.

I.2. Search Method

In a third aspect, the invention relates to a search method for drastically reducing an original set of event notifications to a smaller subset that still comprises all event notifications relevant for a query item. The search method may, for example, be employed by a discovery service for identifying from stored event notifications a subset of event notifications comprising notifications relevant for the query item. Thereby, the purpose of the search method is not to exclusively identify all relevant event notifications—although it is mandatory that all relevant notifications are included in the result—but to bring the amount of event notification down to a manageable number in a time and resource efficient way. The search method may be performed by processing logic that may comprise hardware (e.g., dedicated logic, programmable logic), firmware (e.g., microcode, etc.), software (e.g., algorithmic or relational programs run on a general purpose computer system or a dedicated machine), or a combination of the above.

In an embodiment of the third aspect, the search method is suitable for identifying from an original set of event notifications a subset of event notifications comprising event notifications relevant for a query item, wherein each event notification is either an object event notification or an aggregation event notification, wherein each aggregation event notification comprises an action, a timestamp, a parent identifier and a child identifier, wherein each object event notification comprises a timestamp and an object identifier, and wherein determining the subset comprises the following steps:

(A) adding to the subset each object event notification having an input identifier as object identifier and a timestamp from an input time span;

(B) adding to the subset each aggregation event notification having the input identifier as a child identifier and a timestamp from the input time span;

(C) invoking steps (A) to (C) for each aggregation event notification that was added in the last step (B) and has addition as an action, using the parent identifier of the corresponding aggregation event notification as the input identifier, and using the time span limited by the timestamps of the first and the last aggregation event notification added in the last step (B) as the input time span.

In an embodiment of the third aspect, the initial input time span is unlimited, and wherein the initial input identifier is the unique identifier representing the query item.

In an embodiment of the third aspect, the subset of event notifications comprises at least all event notifications relevant for the query item represented by a unique identifier.

In an embodiment of the third aspect, the original set of event notifications comprises at least all event notifications relevant for the query item represented by a unique identifier.

In an embodiment of the third aspect, the original set of event notifications comprises event notifications generated by entities represented by unique identifiers, wherein the query item and containers are entities, wherein an aggregation event notification is generated every time an entity is added into another entity or deleted from another entity.

In an embodiment of the third aspect, event notifications relevant for the query item consist of: each object event notification having either the query item or a container containing the query item as an object identifier; and each aggregation event notification having either the query item or a container containing the query item as a child identifier.

In an embodiment of the third aspect, the search method infers the action of an aggregation event from the history of the parent identifier and the child identifier of the aggregation event.

According to the third aspect, the search method iteratively identifies a subset of event notifications from an original set of event notifications, wherein the subset comprises at least all event notifications relevant for a query item represented by a unique identifier in a unique identifier network. In particular, the original set of event notifications may be all event notifications generated by a unique identifier network. In the first iteration search step, the search method uses the unique identifier representing the query item as an input identifier and an unlimited time span as an input time span. The search method collects all object event notifications that comprise the input identifier as an object identifier. The search method further collects all aggregation event notifications that comprise the input identifier as a child identifier. From the latter collected aggregation event notifications, the search method determines a time span: the beginning of the time span is the earliest aggregation event notification time stamp and the end of the time span is the latest aggregation event notification time stamp. Then, for each aggregation event notification that was collected in this iteration step and that is an addition aggregation event notification, the search method invokes itself, using the latter determined time span as input time span and the parent identifier as the input identifier. Loosely speaking, the search method traverses through the different containment hierarchies of the query item. This will be particularly evident from the example supply chains discussed at the end of the detailed description. The search method is very efficient because it limits the search space via the input time span and because it only considers event notifications that are likely to be relevant for the query item represented by the initial input identifier. However, the search method may collect events that are not relevant for the query item. This, for example, may be the case if the query item was unpacked from a container, which is used for another purpose in the following, and added again to the container at a later point in time. Such a situation occurs frequently when returnable transport items are used as containers.

In a fourth aspect, the invention relates a system a system for running a discovery service, comprising: a discovery service database for storing event notifications; and an application logic for identifying from an original set of event notifications a subset of event notifications by means of a search method, wherein the subset of event notifications comprises at least all event notifications relevant for a query item represented by a unique identifier, and wherein the original set of event notifications is stored in the discovery service database.

In an embodiment of the fourth aspect, each event notification is either an object event notification or an aggregation event notification, wherein each aggregation event notification comprises an action, a timestamp, a parent identifier and a child identifier, wherein each object event notification comprises a timestamp and an object identifier.

In an embodiment of the fourth aspect, the timestamp is implemented as a chronologically ascending or descending integer ID. Accordingly, for an chronologically ascending integer ID, an event notification corresponding to an event notification generated at an earlier time comprises a lower integer ID than an event notification corresponding to an event notification generated at a later time.

In an embodiment of the fourth aspect, the action of an aggregation event is inferred from the history of the parent identifier and the child identifier. Thus, the discovery service database may not explicitly store the actions of the aggregations events.

I.3 Filter Method

In fifth aspect, the invention relates to a filter method for identifying from a set of event notifications a filtered set of event notifications relevant to a query item. The filter method may be performed by processing logic that may comprise hardware (e.g., dedicated logic, programmable logic), firmware (e.g., microcode, etc.), software (e.g., algorithmic or relational programs run on a general purpose computer system or a dedicated machine), or a combination of the above.

In an embodiment of the fifth aspect, each event notification is either an object event notification or an aggregation event notification, wherein the filtered set of event notifications consists of all event notifications relevant for a query item represented by unique identifier in a unique identifier network, wherein each aggregation event notification comprises an action, a timestamp, a parent identifier and a child identifier, wherein each object event notification comprises a timestamp and an object identifier, and wherein identifying the filtered set comprises the following steps:
  adding to the filtered set each aggregation event notification having addition as an action and, as a child identifier, a unique identifier representing either the query item or a container containing the query item;
  adding to the filtered set each aggregation event notification that fulfills predetermined conditions; and
  adding to the filtered set each object event notification having, as an object identifier, a unique identifier representing either the query item or a container containing the query item.

In an embodiment of the fifth aspect, each aggregation event notification fulfilling the predetermined conditions has deletion as an action and, as a parent identifier, a unique identifier representing a container containing the query item.

In an embodiment of the fifth aspect, each aggregation event notification fulfilling the predetermined conditions has deletion as an action, and, as a parent identifier, a unique identifier representing a container containing the query item, and, as a child identifier, a unique identifier representing a container containing the query item.

In an embodiment of the fifth aspect, the set of event notifications comprises event notifications generated by entities represented by unique identifiers, wherein the query item and containers are entities, wherein an aggregation event notification is generated every time an entity is added into another entity or deleted from another entity.

In an embodiment of the fifth aspect, wherein event notifications relevant for the query item consist of: each object event notification having either the query item or a container containing the query item as an object identifier; and each aggregation event notification having either the query item or a container containing the query item as a child identifier.

In an embodiment of the fifth aspect, the filter method infers the action of an aggregation event from the history of the parent identifier and the child identifier of the aggregation event.

In sixth aspect, the invention relates to a filter method for identifying from a set of event notifications a filtered set of event notifications, wherein the filtered set of event notifications consists of all event notifications relevant for a query item, wherein the set of event notifications comprises event notifications generated by entities represented by unique identifiers, wherein the query item and containers are entities, wherein an aggregation event notification is generated each time an entity is added into a container or deleted from a container, wherein each aggregation event notification comprises an action, a timestamp, a parent identifier and a child identifier, wherein each object event notification comprises a timestamp and an object identifier, and wherein identifying the filtered set comprises the following steps:
  creating a filtered list as the filtered set, which is initially empty;
  creating a stack, which is initially empty;
  pushing the unique identifier of the query item onto the stack; and
  repeating the following steps for each event notification of the set in chronological order:
    pushing the parent identifier of the current event notification on the stack and adding the current event notification to the filtered list if the current event notification is an aggregation event, and comprises addition as an action, and comprises the topmost unique identifier of the stack as a child identifier;
    removing the topmost unique identifier from the stack and adding the current event to the filtered list if the current event notification fulfills predetermined conditions; and
    adding the current event notification to the filtered events list if the current event notification is an object event notification and its object identifier is stored somewhere in the stack.

In an embodiment of the sixth aspect, the predetermined conditions comprise: the current event notification is an aggregation event, and comprises deletion as an action, and comprises the unique identifier second from the top of the stack as a child identifier, and comprises the topmost unique identifier of the stack as a parent identifier.

In an embodiment of the sixth aspect, the predetermined conditions comprise: the current event notification is an aggregation event, and comprises deletion as an action, and comprises the topmost unique identifier of the stack as a parent identifier.

In an embodiment of the sixth aspect, the filter method infers the action of an aggregation event from the history of the parent identifier and the child identifier of the aggregation event.

According to the fifth and sixth aspect, the filter method follows the path of the query item represented by a unique identifier in the unique identifier network. One by one, it analyzes all event notifications in chronological order and looks for event notifications that relate to the query item, which is placed on a stack. The stack reminds the filter method about the outermost container of the query item. Initially, there is no container. Therefore, the stack only comprises one element: the query item. (Herein, 'the query item' can also refer to the unique identifier of the query item. Likewise, any other entity can refer to the unique identifier representing the entity.) All object event notifications comprising the topmost element of the stack are collected. When the filter method finds an additional aggregation event notification that comprises the topmost element of the stack as a child identifier, the parent identifier of this aggregation event notification is put onto the stack. From this point of time, the filter method recognizes this container as the outermost container because the unique identifier representing this container is the topmost element of the stack. When the filter method finds an deletion aggregation event notification that comprises the topmost element of the stack as a parent identifier (and, in an alternative embodiment, the second topmost element of the stack as a child identifier) then the method understands that the query item (or a container containing the query item) is unpacked: the topmost element is removed from the stack, the containment hierarchy has changed again. This way the filter method identifies every single element that is relevant to the query item and none that is not relevant. Consequently, the cost of the filter method scales linearly with the number of event notifications to which the filter method is applied. In most situations, the cost of the search method scales slower than linearly with the number of event notifications to which the search method is applied. Depending on the original event notification set, the combination of the search and the filter method may be more effective than the filter method by itself.

In a seventh aspect, the invention relates to a system for running a discovery service, comprising: a discovery service database for storing event notifications; an application logic for identifying from a set of event notifications a filtered set of event notifications by means of a filter method, wherein the filtered set of event notifications consists of all event notifications relevant for a query item.

In an embodiment of the seventh aspect, the set of event notifications is stored in the discovery service database.

In an embodiment of the seventh aspect, the application logic is further suitable for identifying from an original set of event notifications the set of event notifications by means of a search method, wherein the original set is stored in the discovery service database.

I.3. Advantages

Multiple advantages of the above described aspects and embodiments of the invention are apparent to the skilled person; some of them will be presented in the following:

Client complexity is minimized. Thus, also thin clients such as point-of-sale terminals or mobile devices are now able to process a response from the discovery service directly. The item query is easy to submit and client complexity remains low. Accordingly, even thin clients such as point-of-sale terminals or mobile devices may communicate with a discovery service directly. The client does not have to process the discovery service responses; in particular the client does not rely on XML parsing. Further, the client does not have to analyze the event server responses or may even have to submit more item queries or event queries dependent thereon. Accordingly, the client is also not required to run a web-server-like to application to receive asynchronous responses.

Only low number of messages and network traffic is generated because event data is not completely pushed to the discovery service and the total number of queries to the discovery service and event servers is reduced. Accordingly, very little load is put onto unique identifier network infrastructure.

No confidential information is revealed and the information holder, i.e. the custodian/s, has/have complete data ownership The discovery service returns a correct and complete item query result.

The discovery service avoids unnecessary duplication of data and logic. It also provides for added security and increased efficiency, since all translations take place internally within the discovery service.

The event server addresses and events stored on event servers are not distributed to anyone without appropriate access rights. Only authorized business partners are permitted to access this data. These access rights may be dynamically managed by each custodian on the event server level and/or by the discovery service.

The discovery service is able to identify all locations where the query item has been.

False positives are not indicated by the discovery service. For example, items may be transported via containers that may be returnable transport items represented by a unique identifier: a query item with identifier 1 may be produced and, together with other items, aggregated to a box that is equipped with identifier 2. This box then may be shipped to a first distributer using a returnable transport item represented by identifier 3. The first distributor may forward the box to a retailer without scanning identifier 1. At the retailer, the box may be disaggregated and identifier 1 is read. Afterwards, identifier 3 may be used for other items at a second distributor. Upon an item query regarding the query item with identifier 1, the discovery service provides information that the query item has been at the producer, the first distributor and the retailer. The discovery service does not indicate that the query item or the returnable transport item represented by identifier 3 was at the second distributor—this would have been a false positive.

The retrieval of complete track and trace information about an EPC of interest is fast. A customer (client) in a pharmacy, for example, would not accept to wait several minutes until the genuiness of the product bought (the query item) is confirmed. The same holds true for applications in the area of logistics. Low response latency in the present context means that gathering the complete track and trace information for the query item does require not more than a second.

The discovery service only delivers complete query results. The discovery service protocol ensures that complete query results are delivered. For example, a result is regarded as incomplete if an event server is unavailable and the client is not informed thereon.

The discovery service design is scalable. Once unique identifier technology is widely adopted, hundreds of billions of items will join the EPC network. For example, the European pharmaceutical supply chain counts for 15 billion prescription-only packages of pharmaceuticals and 15 billion prescription-free packages per year. Even larger numbers can be found in the area of tobacco industry or the retail sector. According to some embodiments of the invention, there may be multiple discovery services that may be partitioned via continents and industries, each of them has to be designed scalable to handle the mass of data. Prerequisite for a scalable discovery service design is that it needs only more resources for scaling without any modification to the discovery service approach itself. Furthermore, each discovery service does not conduct complex operations and handles data volumes that are as low as possible.

It is impossible to reveal all information regarding events by taking control over a discovery service. Actual events are exclusively stored on the event servers of the custodians without being replicated to the discovery service. On the event servers, they may be protected by means of an authentication protocol/controller.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

II. DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Example embodiments are described herein in context of a unique identifier network (100), which provides an example of an electronic data environment within which a discovery service (103) may be deployed. However, it will be appreciated that the described technology may be deployed in any electronic data environment, and is not limited to a unique identifier network (100), a product or service data environment, or a supply chain network, and may find application in a wide variety of data environments. Furthermore, while these components are herein described as being implemented using a client-server architecture, it will be appreciated that other architectures (for example, a peer-to-peer or distributed architecture) may also be deployed.

II.1. Unique Identifier Network

Figure 1:
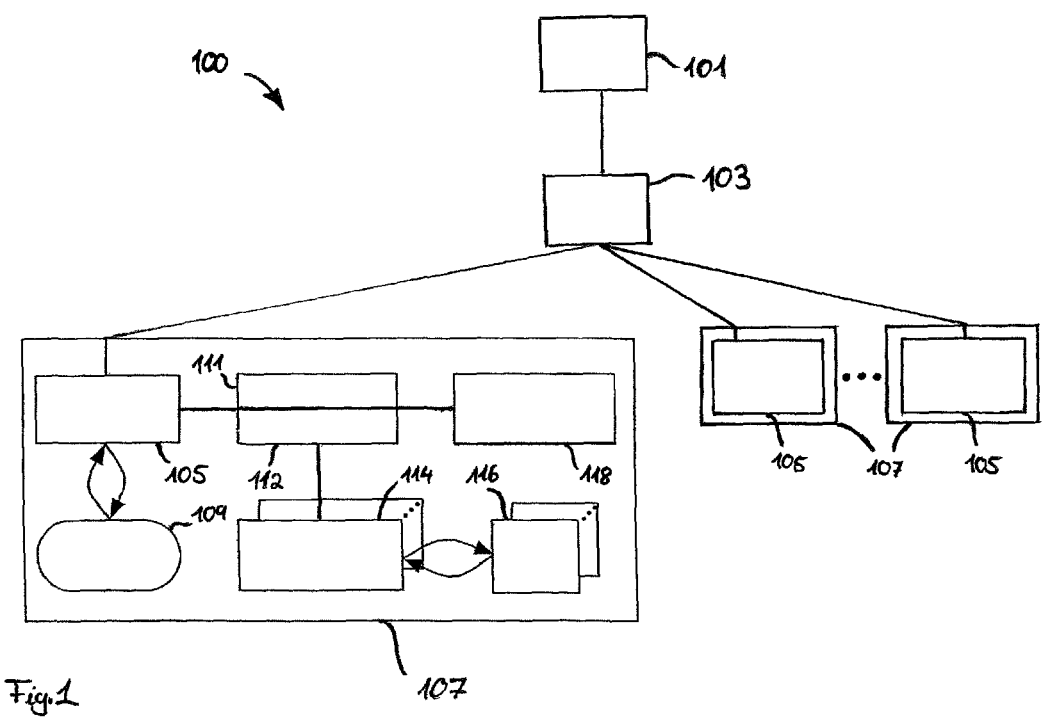
FIG. 1 shows a schematic of an embodiment of a unique identifier network. In particular, it shows an event server, an event server database and a unique tag deployment of a custodian in detail.
Figure 2:
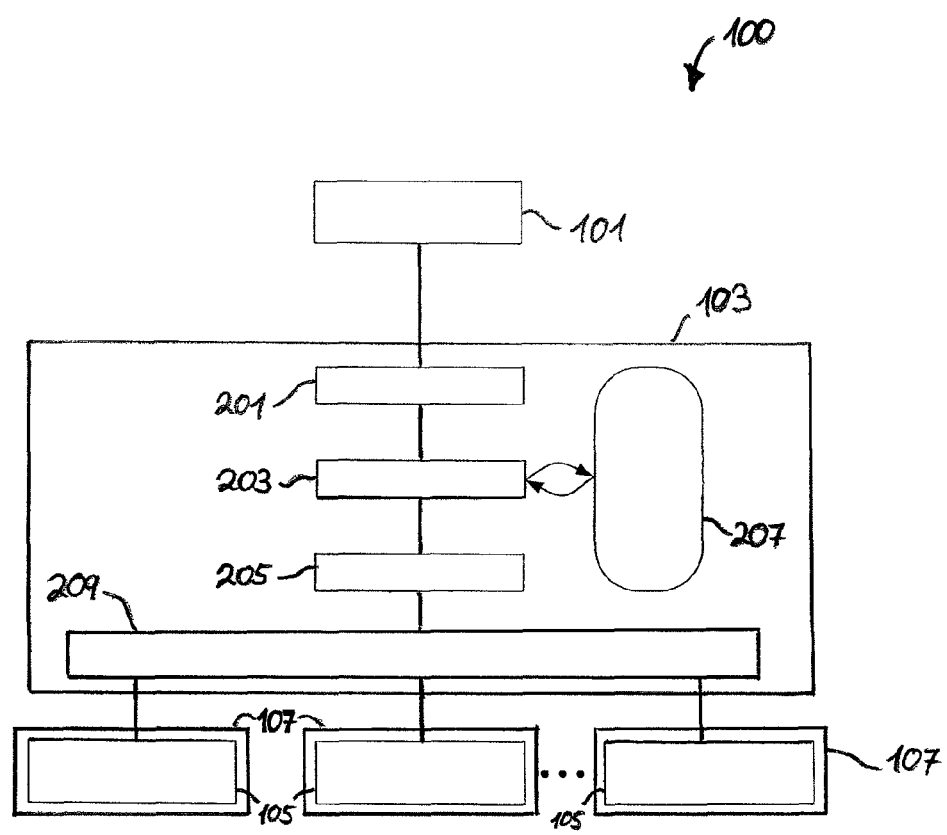
FIG. 2 shows a schematic of an embodiment of a unique identifier network. In particular, it shows the discovery service in detail.
Figure 3:
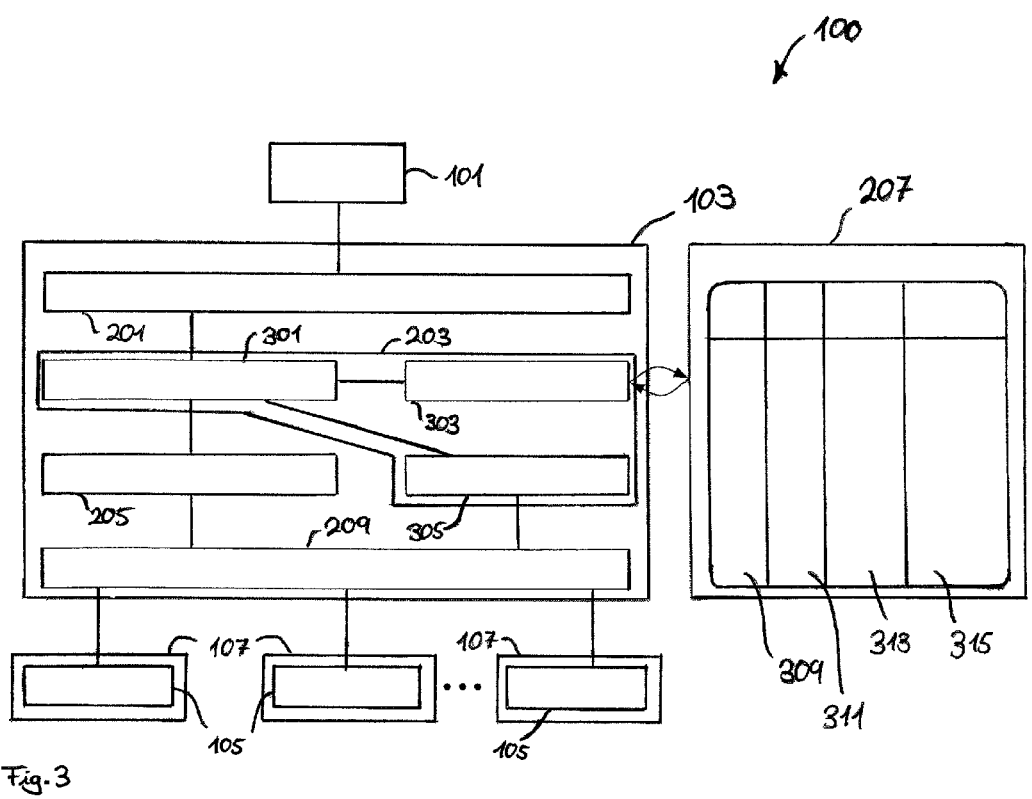
FIG. 3 shows a schematic of an embodiment of a unique identifier network. In particular, it shows the discovery service in detail, wherein components comprised by the application logic of the discovery service are shown explicitly.

According to a first embodiment of the present invention, a unique identifier network (100) comprises a client (101), a discovery service (103), and event servers (105, 115, 135) located at custodians (107, 117, 137), as shown in FIG. 1, FIG. 2 and FIG. 3. The discovery service (103) is communicatively connected to a plurality of event servers (105). The plurality of event servers (105, 115, 135) is located at and belongs to one or more different custodians (107, 115, 135). Only three event servers (105, 115, 135) and custodians (107, 117, 127) are explicitly shown, but the skilled person appreciates that any number of event servers and custodians may be comprised by a unique network (100) according to the first embodiment. Further, one custodian may comprise one or more event servers. The client (101) is communicatively connected to a discovery service (103). In FIG. 1, the different components communicatively and/or operatively connected to the event server (105) of custodian (107) are shown in detail. The event server (105) is operatively connected to an event database (109) and to a middleware (111). The event server (105) stores events in the event database (109) and reads events from the event database (109). The middleware (111) is operatively connected to a unique tag hardware (114) via a device manager (112), wherein the unique tag hardware comprises a tag reader (114) for reading unique identifiers from unique identifier tags (116) and a tag writer (114) for writing unique identifiers onto unique identifier tags (116). As mentioned above, any item or container may comprise a unique identifier tag (116).

II.2. Data Standards

The first embodiment of the unique identifier network (100) is in accordance with the EPC coding scheme. The EPC coding scheme defines how unique identifiers may be encoded, for example, in unique identifier tags (116) and in information systems. According to the EPC standard, items, i.e. physical objects, are uniquely represented by Serialized Global Trade Item Numbers (SGTIN); and containers, i.e. shipping units, such as boxes, palettes, and totes, are uniquely represented by Serialized Shipping Container Code (SSCC). Each SGTIN comprises three parts: a manager code identifying the company responsible for the initial assignment of the EPC to a physical item; a product type code describing the product type; and a serial number used to uniquely identify all product instances of that particular product type. Each SSCC in turn comprises a manager code and a serial number.

The first embodiment of the unique identifier network (100) employs a tag translation standard, which is suitable for translating unique identifiers according to the EPC coding scheme into a representation useful for information systems. In particular, the tag data translation standard defines how to convert the machine-readable binary encoding of an EPC that is stored on the unique tag (116) to a uniform resource name (URN) representation. The binary representation might be '1000 1000 0000 0000 0010 0000 1110 1100 0100 0010 0000 1111 1110 0110 0011 0010' which, for example, can be translated into 'urn:epc:id:sgtin:0037000.030241.1041970'. This URN representation may be used in information systems. The EPC may also be translated into other representations, such as URI, URL or XML.

According to the first embodiment of the unique identifier network (100), an authentication step is performed by each of the plurality of event servers (105). For authentication, a certificate profile standard defines a profile of X.509 certificate issuance and usage to be used within the EPC network. The certificate profile standard defines usage of the X.509 certificates for users, services and servers, such as clients (101), discovery services (103), and event servers (105, 115, 135), as well as tag hardware (114), such as tag readers (114) and tag devices (114). Access rights are defined and managed at the event servers (105, 115, 135) in order to prevent unauthorized access. In alternative embodiments, the authentication step is performed and the access rights are defined and managed by the discovery service (103).

II.3. Unique Identifier Tag/Unique Identifier Tag Deployments

According to the first embodiment, the unique identifier tag (116) is an RFID tag (116) and the custodians (107, 117, 137) employ unique identifier tag deployments that are RFID deployments. Therein, unique identifier tags (116) are attached to entities, such as items and containers, and store the unique identifier (data-on-network). Unique identifier tags (116) also store additional information apart from the unique identifier (data-on-tag). When a unique identifier tag (116) is created (e.g., when the unique identifier is attached to an item or a container), the unique identifier and additional information is written onto the unique identifier tag (116). This is done using a tag writer (114), such as an RFID writer (114) or an RFID printer (114). The unique tag deployments of the first embodiment comprise additional hardware (114), such as infrared sensors (114), weighting machines (114), or temperature sensors (114). Infrared sensors (114) are used to switch tag readers (114) on and off and to determine the direction of moving items. A device manager (112) is used to configure, manage, and control the attached tag readers (114), tag writers (114), and the additional hardware (114). The device manager (112) filters the events and is the interface between the tag-related hardware-oriented layer and business layers requiring well-formatted and context-enriched data. Although, the device manager (112) may be configured to directly communicate with related systems (118) and event servers (105), according to the first embodiment, the middleware (111) is introduced between the device manager (112) and the event server (105) and the related systems (118). The middleware (111) performs the task of processing the incoming events. Middleware processing includes initiating business processes, such as goods receipt or goods issue, in related systems (118), such as an enterprise resource planning or inventory management system. Furthermore, middleware processing includes transferring events from and to the event server (105). A configuration according to the first embodiment, wherein a middleware (111) is included between the event server (105) and the related system (118) is in particular useful because existing systems such as Enterprise Resource Planning (ERP) systems (118) are not designed to handle event information.

II.3. Interface Standards

According to the first embodiment, a variety of interface standards/protocols define the interfaces between the components of the unique identifier tag deployment. Tag protocols define the interface between the unique identifier tags (116) and the unique tag hardware (114). A protocol for ultra high frequency (UHF) communication, Class-1 Generation-2 is employed. In addition, a low level reader protocol specifies the interface between the unique tag hardware (114), such as tag readers (114) and tag writers (114), and the device manager (112). The low level reader protocol allows the device manager (112) to control detailed protocol parameters of the unique tag hardware (114), such as the timing of read or write operations. The tag reader protocol in conjunction with the low level reader protocol specify the interface between the tag readers/writers (114) and the device manager (112), which uses these components to access the unique identification tags (116). The tag reader management protocol defines the way the status and health of tag readers (114) are monitored. An application level event interface translates events into a technology independent data format. Said application level event interface is used by related systems (118), such as ERP systems (118) or shop-floor systems (118). The application level event interface definitions are also used for data transfer between different IT systems. A query interface (201), in particular an EPC information service (EPCIS), is the interface between the event server (105) and the discovery service (103). EPCIS in particular provides answers to the questions: (1) When did a read event happen?; (2) What actually happened?; (3) Where did the read event take place?; and (4) Why did the read event occur?.

II.4. Type of Events

According to the first embodiment, an event can be any of four different event types as defined by the EPC network. An observation event indicates that one or more unique identifier tag comprising items passed a reader without being modified. A quantity event indicates item type and item quantity. An aggregation event indicates that the containment hierarchy was changed. Either an entity (which may be an item or a container) was packed into a container (action=addition) or unpacked from a container (action=deletion). The unique identifier of an entity that is added to or deleted from the container is referred to as child identifiers. The unique identifier of the container into that the entity is packed is identified as the parent identifier. The fourth event is the transaction event, which links a unique identifier to a business transaction like a purchase order. Herein, observation events, quantity events, and transaction events are referred to as object events.

II.5. Discovery Service

According to the first embodiment, each event is stored locally on the event server of the custodian that generated said event. Consequently, events relevant for a query item represented by a unique identifier may be distributed over multiple event servers (105, 115, 125). In case information regarding this query item needs to be retrieved, a discovery service (103) is required that identifies relevant events, finds and aggregates them. Relevant events in this context are by definition: (1) each object event having either the query item or a container containing the query item as an object identifier; and (2) each aggregation event having either the query item or a container containing the query item as a child identifier.

The discovery service (103) determines all relevant unique identifiers that are necessary to gather complete track and trace information about a unique identifier of interest, i.e. gathers all events relevant for the query item represented by the unique identifier of interest. The discovery service (103)

identifies all relevant event servers (105, 115, 135), which are event servers (105, 115, 135) that have information relevant for the query item. It queries all identified event servers (105, 115, 135) in parallel, aggregates the event server (105, 115, 135) responses and finally responds synchronously to the client (101) request.

The discovery service (103) is shown in FIG. 2. The client (101) is communicatively connected to the discovery service (103) via a query interface (201) of the discovery service (103). Within the discovery service (103), the query interface (201) is operatively connected to an application logic (203). The application logic (203) may read event notifications from and store event notifications in a discover service database (207), which is integral to the discovery service (103). In alternative embodiments, the discovery service database (207) is external to the discovery service (103). In particular, the discovery service database (207) is a main memory database. The application logic (203) is operatively connected to a capture interface (205), which in turn is communicatively connected to an event server communication interface (209) for communicating with one or more event servers (105). The application logic (203) is also operatively connected to the event server communication interface (209).

According to the first embodiment, for each event generated at an event server (105, 115, 135), the corresponding event server (105, 115, 135) informs the discovery service (103) that it has information regarding this particular event by submitting an event notification to the discovery service (103) via a capture interface (205) of the discovery service (103). Such an event notification may be an object event notification in case the corresponding event is an object event or it may be an aggregation event notification in case the corresponding event is an aggregation event. An object event notification is structured as shown in the following:

(line 1) <? xml version ="1.0" encoding ="UTF -8"? >
(line 2) <request >
(line 3) < ds_objectEvent >
(line 4) <url >https: // www .pharma - company .com / epcis </url >
(line 5) <eventTime >2010 -11 -03 T20:33:31 .116 -06 :00 </eventTime >
(line 6) <epcList >
(line 7) <epc > urn:epc:id:sgtin:0614141 .107340.1 </epc >
(line 8) <epc > urn:epc:id:sgtin:0614141 .107340.2 </epc >
(line 9) </ epcList >
(line 10) </ ds_objectEvent >
(line 11) </ request >

Accordingly, it comprises data fields, wherein one data field indicates that the current event notification relates to an object event, wherein one date field comprises the address to the event server (105, 115, 135) that generated and stores the corresponding event, wherein one data field comprises a timestamp that indicates the time the corresponding event was generated, wherein one data field comprises a list of unique identifiers related to the corresponding object event, and wherein one member of the list of unique identifiers is the object identifier. An aggregation event notification is structured as shown in the following:

(line 1) <?xml version ="1.0" encoding ="UTF -8"? >
(line 2) <request >
(line 3) <ds_aggregationEvent >
(line 4) <url >https: // www .pharma - company .com / epcis </url >
(line 5) <eventTime >2010 -11 -03 T20:33:31 .116 -06 :00 </ eventTime >
(line 6) <action >ADD </ action >
(line 7) <parentID > urn:epc:id:sscc:0652642 .0123456789 </ parentID >
(line 8) <childEPCs >

-continued (line 9) <epc > urn:epc:id:sgtin:0614141 .107340.2 </epc >
(line 10) <epc> urn:epc:id:sgtin:0614141 .107340.7 </epc >
(line 11) <epc> urn:epc:id:sgtin:0614141 .107340.8 </epc >
(line 12) </ childEPCs >
(line 13) </ ds_aggregationEvent >
(line 14) </ request >

Accordingly, it comprises data fields, wherein one data field indicates that the current event notification relates to an aggregation event, wherein one date field comprises the address to the event server (105, 115, 135) that generated and stores the corresponding event, wherein one data field comprises a timestamp that indicates the time the corresponding event was generated, wherein one data field comprises the action of the corresponding event, i.e. addition or deletion, wherein one data field comprises the parent identifier, and wherein one data field comprises one or multiple child identifiers.

The capture interface (205) extracts relevant information from the incoming event notifications and forwards the relevant information to an index (301), which stores the relevant information in the discovery service database (207) via a persistency manager (303). Relevant information for each event notification comprises: an integer ID data field (309), wherein an event notification corresponding to an event notification generated at an earlier time comprises a lower ID than an event notification corresponding to an event notification generated at a later time; a unique identifier data field (311), which stores the object identifier for an object event and the child identifier for an aggregation event; a parent identifier data field (313), which stores the parent identifier for an aggregation event and is empty for an object event; and an event server address data field (315) comprising the address to the event server (105, 115, 135) storing the corresponding event. One received event notification may result in multiple stored event notifications (i.e. multiple discovery service database entries) in case the one received event notification comprises multiple object identifiers or multiple child identifiers, wherein each stored event notification (i.e. discovery service database entry) comprises only one object identifier or one child identifier, respectively. Furthermore, in the first embodiment, the stored event notifications do not explicitly comprise the action of a received aggregation event notification. However, the action can be inferred from the history of the entities involved in the aggregation event. In case it is known that A is contained in B and an aggregation event comprising A as a child and B as a parent occurs, it is inferred that said aggregation event must be a deletion aggregation event.

Prior to storing the relevant information in the discovery service database (207), the persistency manager (303) discards each object event that comprises a combination of a unique identifier data field entry and an event server address data field entry that already exists in the discovery service database (207).

Clients (101) may use the query interface (201) for submitting an item query regarding an query item represented by a unique identifier, which is therefore the unique identifier of interest for the current query. The query interface (201) forwards the request to the containment solver (301) that interacts with the persistency manager (303) to retrieve the complete list of events and event server addresses that are relevant for this unique identifier of interest. Thereto, the containment solver (301) uses the unique identifier of interest as input parameter and resolves all relevant event servers and relevant unique identifiers regarding all containers and/or containment hierarchies that the unique identifier of interest was involved in. The core of the containment solver (301) is made up of two methods. The search method drastically reduces the original set of stored event notifications to a manageable subset, wherein it finds at least all unique identifiers that are related to the unique identifier of interest. The filter method extracts only relevant event notifications from the subset set generated by the search method. The search method is complete and extremely resource efficient, while the filter method is complete and exact. In combination they are fast, complete and exact—however, in some circumstances it is appreciated that only one of the two methods may be employed. In case, for example, that the original set of stored event notifications is very small, the search method may be omitted without a substantial decrease in performance.

From the results of the containment solver (301), e.g. all events notifications relevant to a query item, the event response aggregator (305) determines relevant events and event server addresses of each event server that stores the relevant events. Then, the event response aggregator (305) queries the event servers (105) for the relevant events. Therein, the event servers (105) are queried in parallel. The responses of the event servers (105, 115, 135), the relevant events, are aggregated in a response aggregator (305). Finally, the query interface (201) responds to the item query by submitting the relevant events to the client (101) in an aggregated form. Accordingly, the client receives only one response per item query.

The persistency manager (303) acts as database management system and an event server communication interface (209) is responsible for communication with the event servers (105).

In the first embodiment of the present invention, the discovery service (103) shifts the complexity of event query parallelization and the aggregation of event server (105) responses from the client (101) to the discovery service (103) and acts like an event server (105, 115, 135) by creating a view of the relevant information for the client (101). The response latency is low—considering that a complete result set is returned. Because a discovery service (103) provider is trustworthy, event servers (105, 115, 135) that have relevant information but decline to share it can send a 'deny' message to the discovery service (103) without being revealed to the client (101). The result of this discovery service (103) approach response is complete while respecting clients' access rights. If event servers (105, 115, 135) are temporarily not available, the aggregating discovery service (103) indicates this to the client (101). It furthermore ensures full data ownership of the information holder, responds synchronously, uses existing infrastructure, and leaves access control information to the custodians and their event servers (105, 115, 135) thus reducing access control complexity. To lower network traffic, the discovery service (103) queries each event server (105, 115, 135) only if it has determined a priori which relevant events were handled by the respective event server (105, 115, 135). The interface standard of the event servers (105, 115, 135) may be adjusted to accept more than one unique identifier at a time. Network traffic is low and no potential for misuse exists.

II.6. Search Method

In the first embodiment, the core of the search method is a recursive method for drastically reducing the original set of event notifications stored in the discovery database to a subset that nevertheless contains at least all event notifications relevant to a query item—even when the query item traversed complex containment hierarchies.

A pseudo code of the search method is as shown in the following listing:

| | |
|---|---|
| (line 1) | Creating a new empty event list for storing relevant event notifications; |
| (line 2) | Getting all object event notifications wherein the input unique identifier was the object identifier while respecting a lower and upper boundary; Storing the result in the event list; |
| (line 3) | Getting all aggregation event notifications wherein the unique identifier was the child identifier while respecting a lower and upper boundary; Storing the result in the event list; |
| (line 4) | FOR all aggregation event notifications stored in line 3 with the action 'addition' DO: |
| (line 6) | 1) Invoking this recursive method again starting from line 2 using: |
| (line 7) | a) the parent identifier as the unique identifier input parameter; |
| (line 8) | b) the lowest timestamp of all aggregation event notifications stored in line 3 as the lower boundary input parameter; and |
| (line 9) | c) the highest timestamp of all aggregation event notifications stored in line 3 as the upper boundary input parameter; |
| (line 10) | 2) Adding the method result of the recursive method to the event list; |
| (line 11) | END; |
| (line 12) | Returning the event list; | wherein the input parameters are: an input unique identifier, an input timestamp describing the lower boundary that the search shall respect, and an input timestamp describing the upper boundary that the search should respect. The timestamps limit the search space for each search iteration step. Initially, the lower boundary is initiated as 0 and the upper boundary as infinity. The lower boundary and the upper boundary define the time span as described above. The output is a list of at least all events relevant to the input unique identifier.

The search method drastically reduces the set of stored event notifications to a manageable subset, wherein it finds at least all unique identifiers that are relevant to the query item represented by the unique identifier of interest. The search method is particularly resource efficient.

II.7. Filter Method

In the first embodiment, the discovery service (103) identifies all event notifications that are relevant for a unique identifier representing a query item. In particular, the discovery service (103) identifies the relevant event notifications from all event notifications stored in the discovery service database (207). These stored event notifications are typically large in number. The search method reduces the stored event notifications to a manageable subset in a fast and resource efficient way. However, the subset generated by the search method may comprise event notifications that are not relevant for the query item. This may be the case if the query item was unpacked from a container and, at a later point in time, added again. Such situations occur frequently when returnable transport items are used as containers.

A filter method is applied to the subset generated by the search method, wherein the filter method returns all events relevant for the query item. First, an input event notification list is initialized comprising the subset of event notifications identified by the search method. During the initialization process, the input event notification list is ordered with respect to the timestamp of the elements comprised by the input event notification list. Because, in the first embodiment, the timestamp of the event notifications is an integer ID, the input event notification list is ordered with respect to the ID of the input event notification list. Accordingly, the first element of the input event notification list is the event notification with the lowest ID (i.e. the earliest timestamp) and the last element of the input event notification list is the event notification with the highest ID (i.e. the latest timestamp). Then, the following steps are performed:

| | |
|---|---|
| (line 1) | Creating a new empty filtered list for storing filtered event notifications; |
| (line 2) | Creating a new empty stack for dynamically representing the containment hierarchy of unique identifiers; |
| (line 3) | Pushing the unique identifier of the query item onto the stack; |
| (line 4) | FOR each element of the input event notification list (starting with the first element and continuing element by element) DO: |
| (line 5) | IF it is an aggregation event notification DO: |
| (line 6) | IF it is an aggregation event notification with the action 'addition' and the child identifier matches the topmost element on the stack DO; |
| (line 7) | Pushing the parent identifier of the current event notification onto the stack; |
| (line 8) | Adding the current event notification to the filtered list; |
| (line 9) | ELSE IF it is an aggregation event notification with the action 'deletion' and the parent identifier of the current event notification matches the topmost element of the stack DO: |
| (line 10) | Removing the topmost unique identifier from the stack; |
| (line 11) | Adding the current event notification to the filtered list; |
| (line 12) | END |
| (line 13) | ELSE IF it is an object event notification and the unique identifier of the current event notification is stored somewhere on the stack DO: |
| (line 14) | Adding the current event notification to the filtered list; |
| (line 15) | END; |
| (line 16) | END; |
| (line 17) | Returning the filtered list; |

As shown and described above, the filter method makes use of a stack to generate a filtered list that only contains events that are relevant for the query item. The filter method basically follows the path of the query item represented by a unique identifier in the unique identifier. One by one, it analyzes all event notifications in chronological order and looks for event notifications that relate to the query item, which is placed on a stack. The stack reminds the filter method about the outermost container of the query item.

II.8. Example Supply Chains

In the following, several example supply chains are discussed in view of the first embodiment of the present invention, wherein the unique identifier network (100) comprises the discovery service (103) that, for identifying event notifications relevant for a query item, employs the search method and the filter method described above.

Figure 4A:
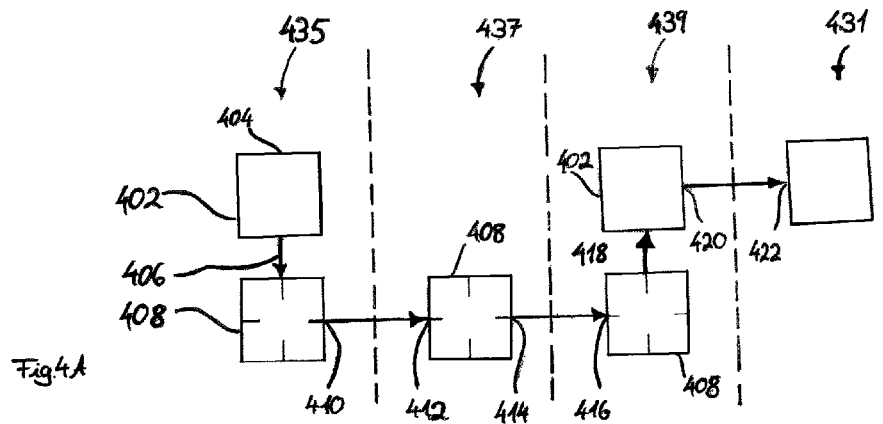
FIG. 4A shows a first example supply chain.
Figure 4B:
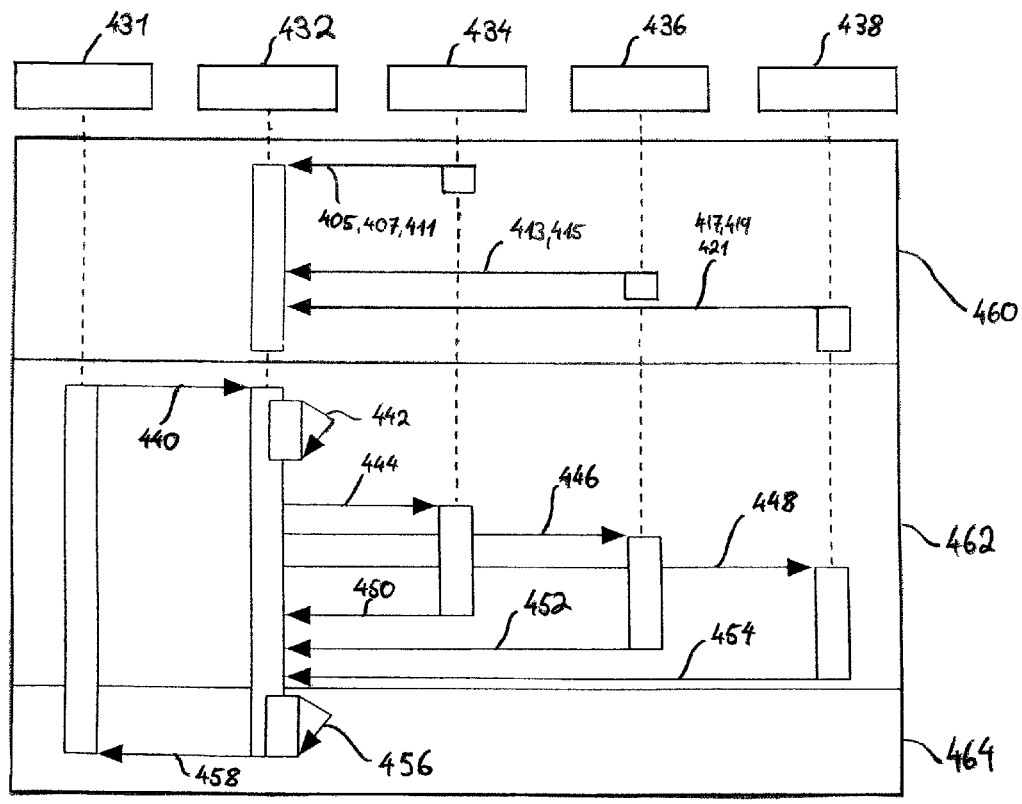
FIG. 4B shows a schematic of an embodiment of a discovery service communication protocol. In particular, it shows data transferred between the different components of the unique identifier network in the case of the first example supply chain.

FIG. 4A shows a schematic of a first example supply chain and FIG. 4B shows a communication protocol employed by event servers (105, 115, 125) and the discovery service (103) according to the first embodiment. Each entity, i.e. query item (402) or container (408), comprises a unique identifier tag (116) storing a unique identifier representing the corresponding entity in the unique identifier network (100). A manufacturer (107), a wholesaler (117), and a distributer (127) are custodians having their own unique identifier tag deployments and event servers (105, 117, 127). During the setup phase (460), the query item (402) is produced (404) by the manufacturer (435), packed (406) into a container (408), and shipped (410) to the wholesaler (117). Events 404, 406 and 410 are generated and stored by the event server (105) located at the manufacturer (107) and corresponding event notifications (405, 407, 411) are sent to the discovery service (103). At the wholesaler (117), the container (408) arrives (412) and is further shipped (414) to the distributer (127). Events 412 and 414 are generated and stored by the event server (115) located at wholesaler (117) and corresponding event notifications (413, 415) are sent to the discovery service (432). At the distributer (127), the container (408) arrives (416) and the query item (402) is unpacked (418). The query item is then sold (420) to a client (101). Events 416, 418 and 420 are generated and stored by the event server (125) located at the distributer (127) and corresponding event notifications (417, 419, 421) are sent to the discovery service (103). The query item (402) is received (422) by the client (431). In the latter step, no event is generated because the client does not comprise unique tag hardware (114). In the discovery phase (462), the client (101) submits a query (440) regarding the query item (402) to the discovery service (432). The discovery service (103) receives the query (440) and identifies (442) all event notifications relevant for the query item (442). In this case all event notifications received by the discovery service (432) are relevant. Accordingly, the discovery service (103) submits queries (444, 446, 448) to the event servers (105, 115, 125), which comprise the relevant events. The event servers (105, 115, 125) send back (450, 452, 454) relevant events, which are received by the discovery service (103). In the fulfillment phase (464), the discovery service (103) aggregates the relevant events and sends (458) them to the client in an aggregated form.

Figure 5:
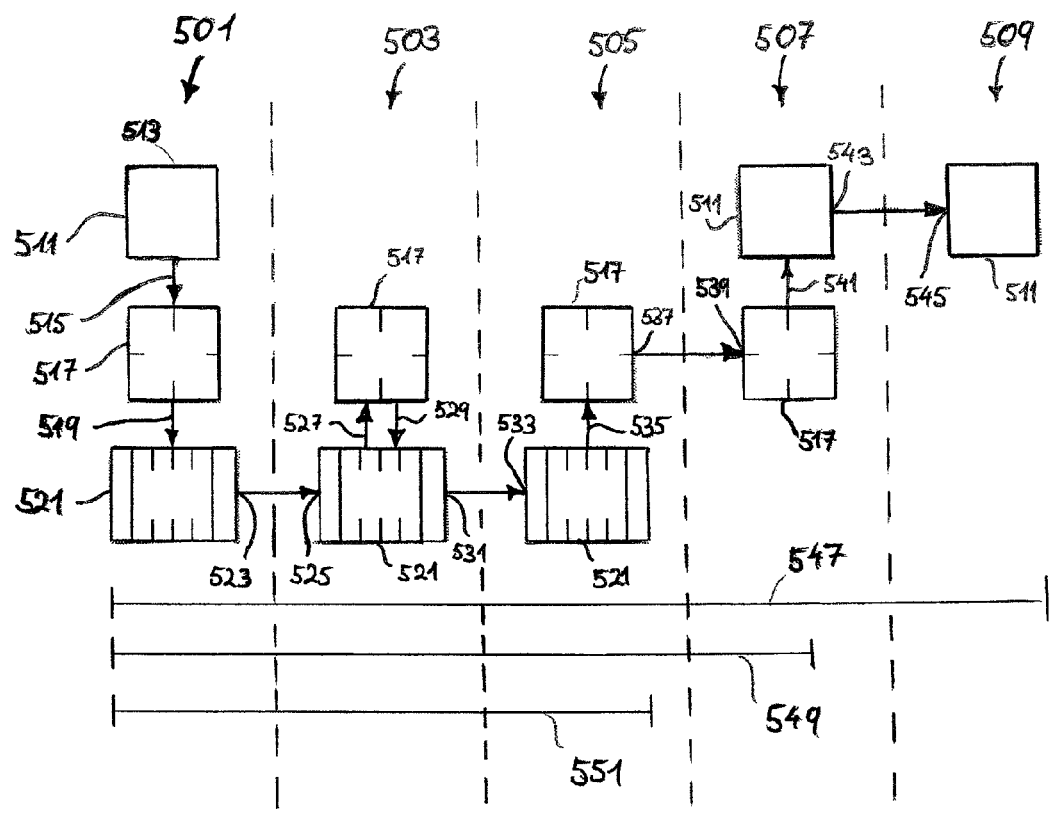
FIG. 5 shows a second example supply chain.

FIG. 5 shows a schematic of a second example supply chain. Each entity, i.e. query item (511) and containers (517, 521), comprises a unique identifier tag (116) storing a unique identifier representing the corresponding entity in the unique identifier network (100). A manufacturer (107), a wholesaler (117), a wholesaler (127), and a distributer (137) are custodians having their own unique tag deployments and event servers (105, 115, 125, 135). During the setup phase, at the manufacturer (107), the query item (511) is produced (513), packed (515) into the container (517), which in turn is packed (519) into the container (521). The container (521) is shipped (523) to the wholesaler (117). Events 513, 515, 519 and 523 are generated and stored by the event server (105) of the manufacturer (107). The container (521) arrives (525) at the wholesaler (503), container (517) is unpacked (527) and repacked (529) into container (521). Then, container (521) is shipped (531) to wholesaler (127). Events 525, 527, 529 and

531 are generated and generated by the event server of the wholesaler (117). At the wholesaler (127), the container (521) arrives (533), and the container (517) is unpacked (535) from the container (521) and shipped (537) to distributer (137). Events 533, 535, and 537 are generated by the event server of the wholesaler (127). At the distributer (507), the container (517) arrives (539), the query item (511) is unpacked (541) from the container (517) and sold (543) to the client (101), who receives (545) the query item (511).

Events 539, 541 and 543 are generated and stored by the event server of the distributer (137). The discovery service (103), upon an item query regarding the query item (511), identifies all event notifications generated in the second example supply chain as relevant.

The discovery service (103) determines the addresses of relevant servers comprising relevant events, i.e. the event servers (105, 115, 125, 135) of manufacturer (107), wholesaler (117), wholesaler (127), and distributer (137), and queries the relevant event servers (105, 115, 125, 135) for the relevant events. The relevant event servers (105, 115, 125, 135) send the relevant events to the discovery service (103), which aggregates the received relevant events and sends them to the client (101) in an aggregated form. In the second example supply chain, there are three containment hierarchies, which are indicated in vertical direction. Accordingly, when the discovery service (103) applies the search method to the event set generated by the second example supply chain, the search method performs three iterative steps, each iterative step with another time span (also referred to as search space): the time span (547) of the first iterative step is unlimited; the time span (549) of the second iterative step is limited by the timestamp of aggregation event 515 and by the timestamp of aggregation event 541; and the time span (551) of the third iterative step is limited by the timestamp of aggregation event 519 and by the timestamp of aggregation event 535.

Figure 6:
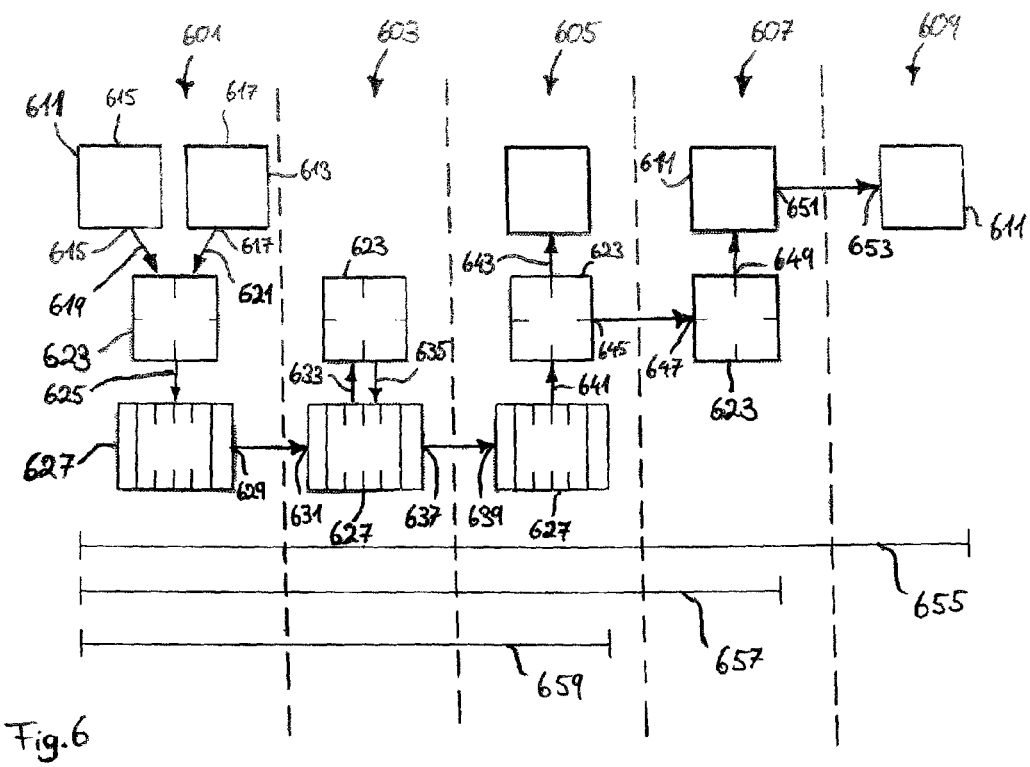
FIG. 6 shows a third example supply chain.

FIG. 6 shows a schematic of a third example supply chain. Each entity, i.e. items (611, 613) and containers (623, 627), comprises a unique identifier tag (116) storing a unique representing the corresponding entity. A manufacturer (107), a wholesaler (117), a wholesaler (127), and a distributer (137) are custodians having their own unique tag deployments and event servers (105, 115, 125, 135). During the setup phase, at the manufacturer (107), the query item (611) is produced (615) and packed (619) into the container (623). Further, the item (613) is produced (617), packed (621) into the container (623). Then, the container (623) is packed (625) into the container (627). The container (627) is shipped (624) to wholesaler (117). Events 615, 619, 617, 621, 625 and 629 are generated and stored by the event server (105) of the manufacturer (107). The container (627) arrives (631) at wholesaler (117), container (623) is unpacked (633) from the container (627) and repacked (635) into container (627). Then, container (627) is shipped (637) to wholesaler (127). Events 631, 633, 635, and 637 are generated and stored by the event server (115) of the wholesaler (117). At the wholesaler (127), the container (627) arrives (637) and the container (623) is unpacked (641). From the container (623), the container (613) is unpacked (643). Then, the container (623) is shipped (645) to distributer (137). Events 637, 641, 643, and 645 are generated and stored by the event server (125) of the wholesaler (127). At the distributer (137), the container (623) arrives (647), the query item (611) is unpacked (649) and sold (651) to the client (101), who receives (653) the query item (611). Events 347, 649, and 651 are generated and stored by the event server (135) of the distributer (137).

Upon an item query regarding the query item (611), the discovery service (103) identifies all event notifications generated in the second example supply chain as relevant, apart from events 617, 621, and 643. These are not relevant for query item (611) and are therefore not identified upon an item query regarding the query item (611). In particular they are not relevant because: 617 is an object event having the item (613) as an object identifier—accordingly, neither the query item (611) nor a container containing the query item (611) is the object identifier of object event 617; 621 is an aggregation event having the item (613) as a child identifier—accordingly, neither the query item (611) nor a container containing the query item (611) is the child identifier of aggregation event 621; and 643 is an aggregation event having the item (613) as a child identifier—accordingly, neither the query item (611) nor a container containing the query item (611) is the child identifier of aggregation event 643.

The discovery service (103) determines the addresses of relevant servers comprising relevant events, i.e. the event servers (105, 115, 125, 135) of manufacturer (107), wholesaler (117), wholesaler (127), and distributer (137), and queries the relevant event servers (105, 115, 125, 135) for the relevant events. The relevant event servers (105, 115, 125, 135) send the relevant events to the discovery service (103), which aggregates the received relevant events and sends them to the client (101) in an aggregated form. In the third example supply chain, there are three containment hierarchies, which are indicated in vertical direction. Accordingly, when the discovery service (103) applies the search method to the event set generated by the third example supply chain, the search method performs three iterative steps, each iterative step with another time span (also referred to as search space): the time span (655) of the first iterative step is unlimited; the time span (657) of the second iterative step is limited by the timestamp of aggregation event 615 and by the timestamp of aggregation event 649; and the time span (659) of the third iterative step is limited by the timestamp of aggregation event 625 and by the timestamp of aggregation event 641.

Figure 7:
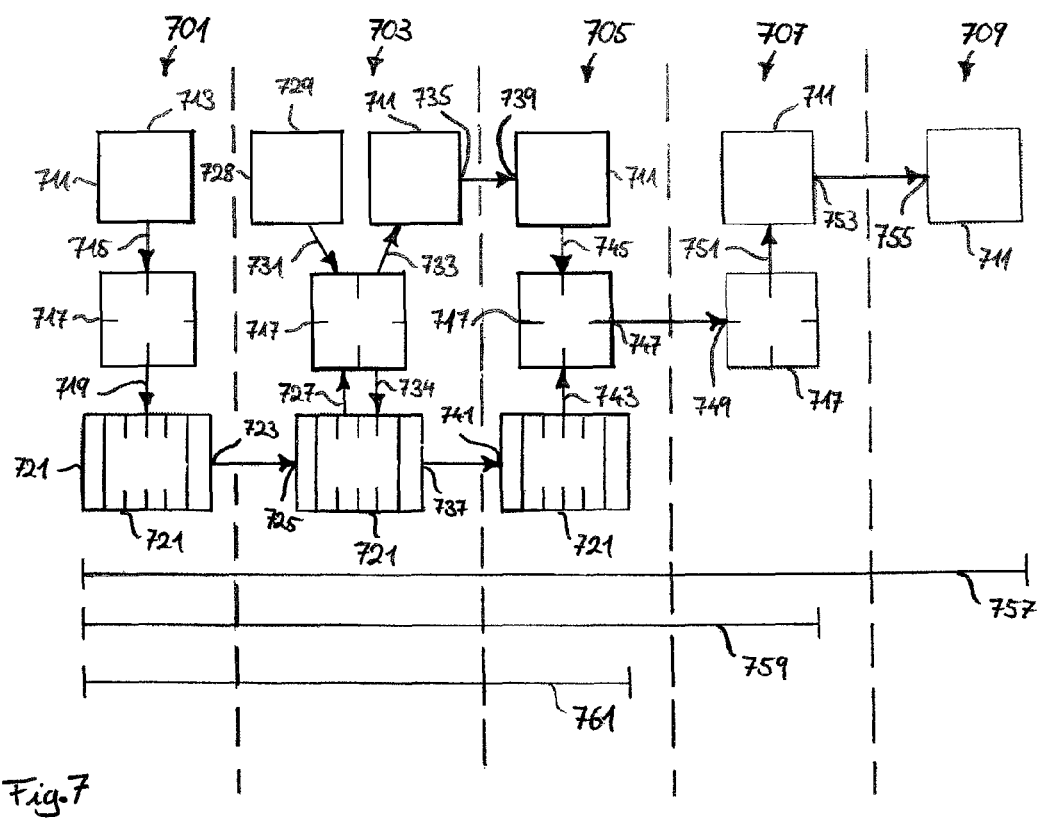
FIG. 7 shows a fourth example supply chain.

FIG. 7 shows a schematic of a fourth example supply chain. Each entity, i.e. items (711, 728) and containers (717, 721, 742), comprises a unique identifier tag (116) storing the unique identifier representing the corresponding entity. A manufacturer (107), a wholesaler (117), a wholesaler (127), and a distributer (137) are all custodians having their own unique tag deployments and event servers (105, 115, 125, 135). During the setup phase, at the manufacturer (107), the query item (711) is produced (713) and packed (715) into the container (717). Then, the container (717) is packed (719) into the container (721). The container (721) is shipped (723) to wholesaler (117). Events 713, 715, 719, and 723 are generated and stored by the event server (105) of the manufacturer (107). The container (721) arrives (725) at wholesaler (117) and the container (717) is unpacked (727) from the container (721). The item (728) is produced (729) at the wholesaler (117) and packed into the container (717). The query item (711) is unpacked (733) from the container (717). Then, the container (717) is packed (734) into the container (721). The query item (711) is shipped (735) to the wholesaler (127) and the container (721) is also shipped (737) to the wholesaler (127). Events 725, 727, 729, 731, 733, 734, 735, and 737 are generated and stored by the event server (115) of the wholesaler (117). At the wholesaler (127), the query item (711) arrives (739) and the container (721) arrives (741). Then, the container (717) is unpacked (743) from the container (721). The query item (711) is packed (745) into the container (717). The container (717) is shipped to distributer (137). Events 739, 741, 743 and 747 are generated and stored by the event server (125) of the wholesaler (127). At the distributer (137), the container (717) arrives (749), and the query item (711) is unpacked (751) from the container (717) and sold (753) to the client (101), who receives (755) the query item (711). Events 749, 751, and 753 are generated and stored by the event server (135) of the distributer (137).

Upon an item query regarding query item (711), the discovery service (103) identifies all event notifications generated in the second example supply chain as relevant, apart from events 729, 731, 737, 741, and 743. These are not relevant for query item (711) and are therefore not identified upon an item query regarding the query item (711). In particular they are not relevant because: 729 is an object event having the item (728) as an object identifier—accordingly, neither the query item (711) nor a container containing the query item (711) is the object identifier of object event 729; 731 is an aggregation event having the item (728) as a child identifier—accordingly, neither the query item (711) nor a container containing the query item (711) is the child identifier of aggregation event 731; 737 and 741 are object events having the container (721) as an object identifier, wherein the container (721) does not contain the query item (711) at that moment—accordingly, neither the query item (711) nor a container containing the query item (711) are the object identifiers of object events 737 and 741; and 743 is an aggregation event having the container (717) as a child identifier, wherein the container (717) does not contain the query item (711) at that moment—accordingly, neither the query item (711) nor a container containing the query item (711) is the child identifier of aggregation event 743.

When the containment solver (301) of discovery service (103) applies the search method to the event notifications generated by the fourth example supply chain, the following happens: In the first iteration step, the input time span (757) is unlimited and the input identifier is the query item (711) (i.e. the unique identifier representing the query item (711) in the unique identifier network). In the first iteration step four aggregation event notifications comprising the input identifier as child identifier are collected: 715, 733, 745, and 751. Further, the object event notifications 735, 739 and 753 having the input identifier as object identifier are collected. The next iteration steps are invoked for addition event notifications comprising the current input parameter as child identifier: 715 and 745. In the second iteration step related to 715, the input identifier is the container (717) and the input time span (759) is limited by event notifications 715 and 751, the event notifications found in the last iteration step with the lowest and the highest timestamp. Since the input parameters are identical for the iteration step related to 751, the second iteration step is invoked only once—otherwise only redundant results would be produced. Four aggregation event notifications are collected: 719, 727, 734 and 743. Two object events are collected: 747 and 749. The next iteration steps are invoked for addition event notifications comprising the current input parameter as child identifier: 719 and 734. In the third iteration step related to 719, the input identifier is the container (721) and the input time span (761) is limited by event notifications 719 and 743, the event notifications found in the last iteration step with the lowest and the highest timestamp. Since the input parameters are identical for the iteration step related to 734, the third iteration step is invoked only once—otherwise only redundant results would be produced. No aggregation event notifications are collected. Four object events are collected: 723, 725, 737, and 741. No more iteration steps are invoked. Accordingly, the search method identified the following events: 715, 733, 745, 751, 735, 739, 753, 719, 727, 734, 743, 747, 749, 723, 725, 737, and 741. Of the identified (collected) events, 737, 741 and 743 are not relevant for the query item (711).

However, the containment solver (301) then applies the filter method to the set of event notifications identified by the search method. For that purpose the identified event notifications are sorted chronologically in time: 715, 719, 723, 725, 727, 733, 734, 735, 737, 739, 741, 743, 745, 747, 749, 751, and 753. A stack is created, which only has the query item (711) as element. In the following, one by one, the filter method identifies the relevant events. 715 is an addition aggregation event notification comprising the topmost element of the stack as a child identifier—accordingly, the parent identifier is pushed on the stack and the current event is identified as relevant. 719 is an addition aggregation event notification comprising the topmost element of the stack as a child identifier—accordingly, the parent identifier is pushed on the stack and the current event is identified as relevant. 723 is an object event notification comprising the topmost element of the stack as an object identifier—accordingly the current event is identified as relevant. 725 is an object event notification comprising the topmost element of the stack as an object identifier—accordingly the current event is identified as relevant. 727 is a deletion aggregation event notification comprising the topmost element of the stack as parent identifier—accordingly the topmost element is removed from the stack and the current event is identified as relevant. 733 is a deletion aggregation event notification comprising the topmost element of the stack as parent identifier—accordingly the topmost element is removed from the stack and the current event is identified as relevant. 734 is an addition aggregation event not comprising the topmost element of the stack as child identifier—accordingly the current event is discarded. 735 is an object event notification comprising the topmost element of the stack as an object identifier—accordingly the current event is identified as relevant. 737 is an object event notification not comprising the topmost element of the stack as an object identifier—accordingly the current event is discarded. 739 is an object event notification comprising the topmost element of the stack as an object identifier—accordingly the current event is identified as relevant. 741 is an object event notification not comprising the topmost element of the stack as an object identifier—accordingly the current event is discarded. 743 is a deletion aggregation event notification not comprising the topmost element of the stack as parent identifier—accordingly the current event is discarded. 745 is an addition aggregation event notification comprising the topmost element of the stack as a child identifier—accordingly, the parent identifier is pushed on the stack and the current event is identified as relevant. 747 is an object event notification comprising the topmost element of the stack as an object identifier—accordingly the current event is identified as relevant. 749 is an object event notification comprising the topmost element of the stack as an object identifier—accordingly the current event is identified as relevant. 751 is a deletion aggregation event notification comprising the topmost element of the stack as parent identifier—accordingly the topmost element is removed from the stack and the current event is identified as relevant. 753 is an object event notification comprising the topmost element of the stack as an object identifier—accordingly the current event is identified as relevant. Accordingly, all relevant events are identified by the containment solver (301): 715, 719, 723, 725, 727, 733, 735, 739, 745, 747, 749, 751, and 753. All event notifications that are not relevant are discarded: 734, 737, 741 and 743.

The discovery service (103) determines the addresses of relevant servers comprising relevant events, i.e. the event servers (105, 115, 125, 135) of manufacturer (107), wholesaler (117), wholesaler (127), and distributer (137), and queries the relevant event servers (105, 115, 125, 135) for the relevant events. The relevant event servers (105, 115, 125, 135) send the relevant events to the discovery service (103), which aggregates the received relevant events and sends them to the client (101) in an aggregated form. In the fourth example supply chain, there are three containment hierarchies, which are indicated in vertical direction. Accordingly, when the discovery service (103) applies the search method to the event set generated by the fourth example supply chain, the search method performs three iterative steps, each iterative step with another time span (also referred to as search space): the time span (757) of the first iterative step is unlimited; the time span (759) of the second iterative step is limited by the timestamp of aggregation event 715 and by the timestamp of aggregation event 751; the time span (761) of the third iterative step is limited by the timestamp of aggregation event 719 and by the timestamp of aggregation event 743.

II.9. Example Application: the European Pharmaceutical Supply Chain

A possible application of the unique identifier network (100) is the pharmaceutical supply chain. More and more counterfeit medicinal products emerge in the European pharmaceutical supply chain. Currently, no appropriate means for identifying counterfeit medicinal products are available: Imported medicinal products are only checked when they pass the borders of the European community—afterwards no efficient means for verification exist. The European commission is aware of this problem and proposed an amended directive regarding to medicinal products in conjunction with a track-and-trace service for medicinal products. The amended directive demands that prescription medicinal products are identifiable and traceable and that the authenticity of the prescription medicinal products is verifiable. The general idea is that authorized participants of the pharmaceutical supply chain and consumers should be able to use the unique identifier to query a verification service in order to verify the authenticity of a particular medicinal product. For example, when a medicinal product is sold or dispensed to a client (101), the verification service should provide the client (101) with information regarding the medicinal product comprising: unique identification information, shipping information, and authenticity information. For this purpose, a unique identifier network (100) according to the first embodiment can be applied to the pharmaceutical supply chain. Herein, unique identifier tags (116) are attached to each medicinal product package and to each container, such as boxes and pallets, which are used for shipping said medicinal product package. At neuralgic points of the pharmaceutical supply chain, unique identifier tag deployments are set up. Such neuralgic points are, at least any custodian (107), for example, any manufacturer, any wholesaler, distributer and retailer of prescription medicinal products. To ensure traceability, all custodians (107) of prescription medicinal products must generate and store events for all prescription medicinal products they handle. Accordingly, every time a prescription medicinal product or a container of prescription medicinal products passes a neuralgic point in the supply chain, their unique identifier tags (116) are read by unique identifier tag hardware (114) comprised by the unique identifier tag deployments and an event is generated and stored in an event server (105). Such an event may comprise context enriched information. Further, a discovery service (103) is comprised by a unique identifier network (100). This discovery service (103) assumes the role of the verification service (103) that determines all custodians (107, 117, 127, 137) the product passed in the supply chain. The verification service (103) is suitable for identifying, finding, and aggregating all events relevant for any prescription medicinal product. A client (101), such as a consumer of a particular prescription medicinal product, a medical doctor, or a pharmacist, may query the verification service (103) for verification information regarding the particular prescription medicinal product. The verification service (103) then determines whether a particular prescription medicinal product was produced by a certified manufacturer and handled by trustworthy distributors and retailers only and provides the client (101) with according verification information. The verification service (103) employs the search method and the filter method for identifying all event notifications relevant for a particular prescription medicinal drug. Thereby, events are shared in the unique identifier network (100) in a secure, cost-efficient, and effective way.

II.10. Example Machine

Figure 8:
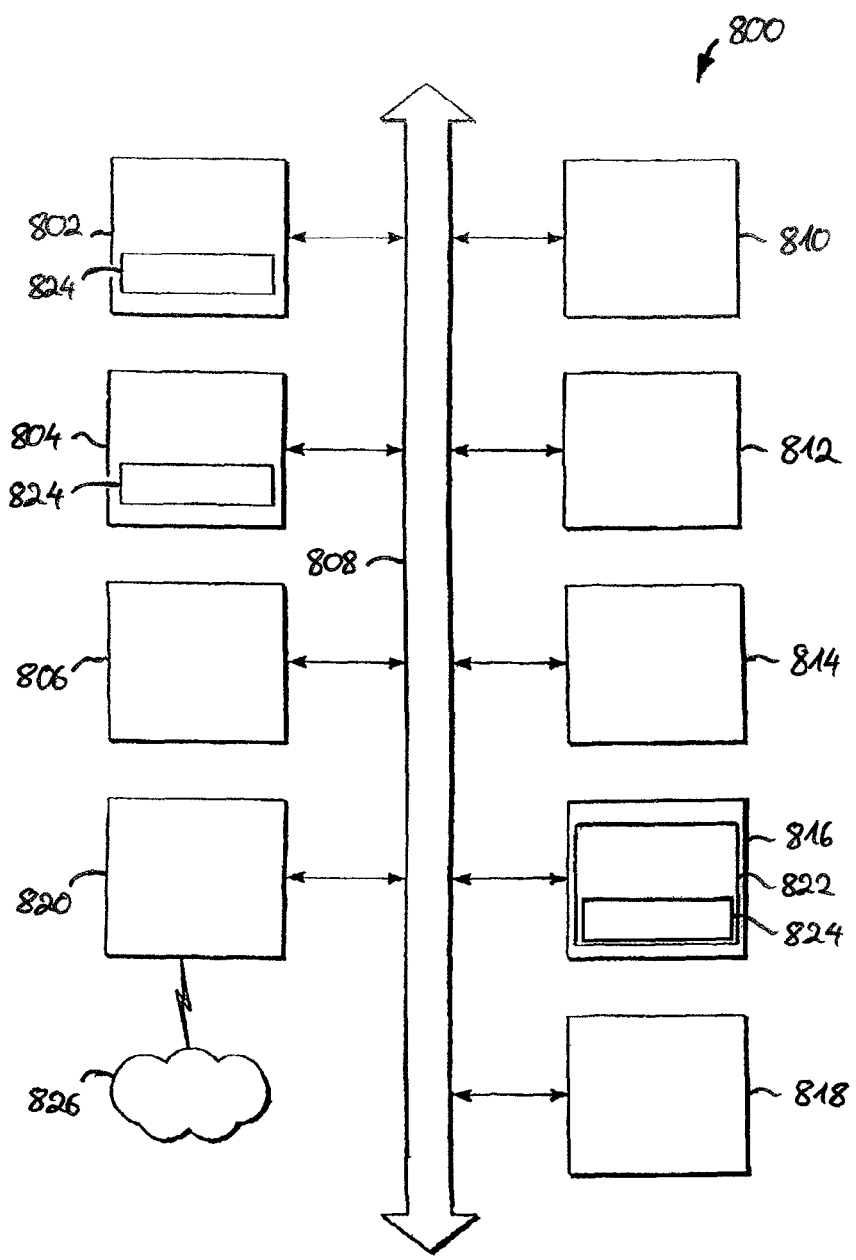
FIG. 8 shows a block diagram of a machine in the example form of a computer system within which a set of instructions, for causing the machine perform any one or more of the methodologies discussed herein, may be executed.

FIG. 8 is a block diagram of a machine in the example form of a system 500 within which a set of instructions, for causing the machine to perform any one or more of the methodologies discussed herein, may be executed. The system for running a client (herein also referred to as 'client') and the system for running a discovery service (herein also referred to as 'discovery service') may be an according machine. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. The machine may be a personal computer (PC), a point of sale terminal, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., HTTP) and embodied as a transmission medium (e.g., a carrier wave signal).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media. Example embodiments may be implemented in digital electronic circuitry, or in computer hardware, firmware, software, or in combinations of them. Example embodiments may be implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A "non-transitory" medium excludes transitory media such as transmitted signals.

Instructions constituting a computer program can be written in any form of programming language, including compiled or interpreted languages, and may be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Certain applications or processes are described herein as including a number of components, modules or mechanisms. A component, module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments.

II.11 Alternative Embodiments

There are various possibilities to implement and carry out methods and apparatus according to the invention. Some alternatives will be presented in the following, others will be apparent to the person skilled in the art based on the summary, the detailed description, and the claims at hand.

As described above, the search method drastically reduces the original set of stored event notifications to a manageable subset, wherein it finds at least all unique identifiers that are related to the unique identifier of interest. The filter method, extracts only relevant event notifications from the subset set generated by the search method. The search method is complete and extremely resource efficient, while the filter method is complete and exact. In combination they are fast, complete and exact—however, in some circumstances it is appreciated that only one of the two methods may be employed. In case, for example, that the original set of stored event notifications is very small, the search method may be omitted without a substantial decrease in performance.

According to a first alternative embodiment, the filter method is applied to all stored event notifications or to a subset generated by a method different from the search method. Prerequisites are that the set/subset of input event notifications is complete and ordered with respect to time.

According to a second alternative embodiment, a filter method for identifying all events relevant for the query item is performed as follows: First, an input event notification list is initialized comprising a set of event notifications. Prerequisite is that the set comprises at least all events relevant for the query item. During the initialization process, the input event notification list is ordered with respect to the timestamp of the elements comprised by the input event notification list. Because, in the first embodiment, the timestamp of the event notifications is an integer ID, the input event notification list is ordered with respect to the ID of the input event notification list. Accordingly, the first element of the input event notification list is the event notification with the lowest ID (i.e. the earliest timestamp) and the last element of the input event notification list is the event notification with the highest ID (i.e. the latest timestamp). Then, the following steps are performed:

| | |
|---|---|
| (line 1) | Creating a new empty filtered list for storing filtered event notifications; |
| (line 2) | Creating a new empty stack for dynamically representing the containment hierarchy of unique identifiers; |
| (line 3) | Pushing the unique identifier of the query item onto the stack; |
| (line 4) | FOR each element of the input event notification list (starting with the first element and continuing element by element) DO: |
| (line 5) |    IF it is an aggregation event notification DO: |
| (line 6) |       IF it is an aggregation event notification with the action 'addition' and the child identifier matches the topmost element on the stack DO; |
| (line 7) |          Pushing the parent identifier of the current event notification onto the stack; |
| (line 8) |          Adding the current event notification to the filtered list; |
| (line 9) |       ELSE IF it is an aggregation event notification with the action 'deletion' and the parent identifier of the current event notification matches the topmost element of the stack and the child identifier matches the second element from the top of the stack DO: |
| (line 10) |          Removing the topmost unique identifier from the stack; |
| (line 11) |          Adding the current event notification to the filtered list; |
| (line 12) |       END |
| (line 13) |    ELSE IF it is an object event notification and the unique identifier of the current event notification is stored somewhere on the stack DO: |
| (line 14) |       Adding the current event notification to the filtered list; |
| (line 15) |    END; |
| (line 16) | END; |
| (line 17) | Returning the filtered list; |

As shown, the filter method uses a stack to solve this problem. The output is a filtered list that only contains events that are relevant to the unique identifier of interest. The filter method according to second alternative embodiment may be applied to any set of event notifications—the set does not have to be generated by the search method. One prerequisite is, however, that all relevant events for the query item are comprised by the set.

A first aspect of a third alternative embodiment relates to a communication protocol method for tracking and tracing a query item represented by a unique identifier in a unique network, using a discovery service, wherein the discovery service comprises a database for storing event notifications, wherein each event notification comprises an event server address for an event server that comprises the corresponding event, wherein the communication protocol method comprises the following steps:
   receiving event notifications from event servers;
   storing the event notifications in the database;
   receiving an item query from a client, wherein the item query includes the unique identifier representing the query item; and
   identifying from the stored event notifications a filtered set of event notifications relevant for the query item.

A second aspect of the third alternative embodiment relates to the communication protocol method according to the first aspect of the third alternative embodiment, further comprising the step of:
   determining, from the filtered set, relevant events and relevant event server addresses of relevant event servers, wherein each event server storing one or more relevant events is a relevant event server.

A third aspect of the third alternative embodiment relates to the communication protocol method according to the second aspect of the third alternative embodiment, wherein the communication protocol method further comprises the steps of:
   submitting event queries for the relevant events to the relevant event servers in parallel;
   receiving the relevant events from the relevant event servers;
   aggregating the relevant events; and
   submitting the relevant events to the client in an aggregated form.

A fourth aspect of the third alternative embodiment relates to the communication protocol method according to one of the previous aspects of the third alternative embodiment,
   wherein each event notification is either an aggregation event notification or an object event notification;
   wherein each aggregation event notification comprises an event server address, a parent identifier, and a child identifier,
   wherein each object event notification comprises an event server address and an object identifier; and
   wherein event notifications relevant for the query item consist of:
      each object event notification having the unique identifier of either the query item or a container containing the query item as an object identifier; and
      each aggregation event notification having the unique identifier of either the query item or a container containing the query item as a child identifier.

A fifth aspect of the third alternative embodiment relates to the communication protocol method according to one of the previous aspects of the third alternative embodiment, wherein each event notification entry stored in the discovery service database comprises a timestamp, and wherein the step of identifying employs a search method and/or a filter method.

A sixth aspect of the third alternative embodiment relates to the communication protocol method according to one of the previous aspects of the third alternative embodiment, wherein each event server comprises:
   an event database for storing events; and
   a communication interface for submitting event notifications to the discovery service, and for receiving event queries from the discovery service, and for submitting events to the discovery service.

A seventh aspect of the third alternative embodiment relates to the communication protocol method according to one of the previous aspects of the third alternative embodiment, wherein each event server comprises: an access controller for performing access control for each event query received from the discovery service.

An eight aspect of the third alternative embodiment relates to the communication protocol method according to the seventh aspect of the third alternative embodiment, wherein the item query comprises an authentication certificate, wherein each event query includes the authentication certificate of the corresponding item query, and wherein access control for the event queries is performed by the access controllers of the event servers on the basis of the authentication certificate.

A ninth aspect of the third alternative embodiment relates to the communication protocol method according to one of the previous aspects of the third alternative embodiment, wherein the item query comprises an authentication certificate, wherein access control for the event queries is performed by the discovery service on the basis of the authentication certificate.

A tenth aspect of the third alternative embodiment relates to the communication protocol method according to one of the previous aspects of the third alternative embodiment, wherein the discovery service stores item query information regarding each item query.

An eleventh aspect of the third alternative embodiment relates to a system for running a discovery service for tracking and tracing a query item represented by a unique identifier in a unique identifier network, comprising:
  an event server communication interface for receiving events and event notifications from event servers, wherein each event notification comprises an event server address;
  a query interface for receiving an item query, wherein a unique identifier representing the query item in the unique identifier network is included in the item query; and
  an application logic comprising:
    a persistency manager for storing and retrieving the event notifications in a discovery service database; and
    a containment solver for identifying all relevant events from the stored event notifications, and for determining, from the filtered set, relevant events and relevant event server addresses of relevant event servers, wherein each event server storing one or more relevant events is a relevant event server.

A twelfth aspect of the third alternative embodiment relates to the system according to the eleventh aspect of the third alternative embodiment, wherein the application logic further comprises: a response query aggregator for submitting event queries for the relevant events to the corresponding event servers in parallel, and for receiving the relevant events from the relevant event servers, and for aggregating the relevant events, wherein the query interface is suitable for submitting the relevant events to the client in an aggregated form.

A thirteenth aspect of the third alternative embodiment relates to the system according to either the eleventh or the twelfth aspect of the third alternative embodiment, wherein the discovery service database is a main memory database.

A first aspect of a fourth alternative embodiment relates to a search method for identifying from an original set of event notifications a subset of event notifications comprising event notifications relevant for a query item, wherein each event notification is either an object event notification or an aggregation event notification, wherein each aggregation event notification comprises an action, a timestamp, a parent identifier and a child identifier, wherein each object event notification comprises a timestamp and an object identifier, and wherein determining the subset comprises the following steps:
  (A) adding to the subset each object event notification having an input identifier as object identifier and a timestamp from an input time span;
  (B) adding to the subset each aggregation event notification having the input identifier as a child identifier and a timestamp from the input time span;
  (C) invoking steps (A) to (C) for each aggregation event notification that was added in the last step (B) and has addition as an action, using the parent identifier of the corresponding aggregation event notification as the input identifier, and using the time span limited by the timestamps of the first and the last aggregation event notification added in the last step (B) as the input time span.

In a second aspect of the fourth alternative embodiment based on the first aspect of the fourth alternative embodiment, an initial input time span is unlimited and an initial input identifier is the unique identifier representing the query item.

In a fourth second aspect of the fourth alternative embodiment based on one of the previous aspects of the fourth alternative embodiment, the subset of event notifications comprises at least all event notifications relevant for the query item represented by a unique identifier.

In a fourth aspect of the fourth alternative embodiment based on one of the previous aspects of the fourth alternative embodiment, the original set of event notifications comprises at least all event notifications relevant for the query item represented by a unique identifier.

In a fifth aspect of the fourth alternative embodiment based on one of the previous aspects of the fourth alternative embodiment, the original set of event notifications comprises event notifications generated by entities represented by unique identifiers, wherein the query item and containers are entities, and wherein an aggregation event notification is generated every time an entity is added into another entity or deleted from another entity.

In a sixth aspect of the fourth alternative embodiment based on one of the previous aspects of the fourth alternative embodiment, the event notifications relevant for the query item consist of: each object event notification having either the query item or a container containing the query item as an object identifier; and each aggregation event notification having either the query item or a container containing the query item as a child identifier.

In a seventh aspect of the fourth alternative embodiment based on one of the previous aspects of the fourth alternative embodiment, the search method infers the action of an aggregation event from the history of the parent identifier and the child identifier of the aggregation event.

An eighth aspect of the fourth alternative embodiment relates to a system for running a discovery service, comprising: a discovery service database for storing event notifications; an application logic for identifying from an original set of event notifications a subset of event notifications by means of a search method, wherein the subset of event notifications comprises at least all event notifications relevant for a query item represented by a unique identifier, and wherein the original set of event notifications is stored in the discovery service database.

In a ninth aspect of the fourth alternative embodiment based on the eighth aspect of the fourth alternative embodiment, each event notification is either an object event notification or an aggregation event notification, each aggregation event notification comprises an action, a timestamp, a parent identifier and a child identifier, each object event notification comprises a timestamp and an object identifier.

In a tenth aspect of the fourth alternative embodiment based on aspect 8 or 9 of the fourth alternative embodiment, the timestamp is implemented as a chronologically ascending or descending integer ID.

In an eleventh aspect of the fourth alternative embodiment based on one of the aspects 8 to 10 of the previous aspects of the fourth alternative embodiment, the action of an aggregation event is inferred from the history of the parent identifier and the child identifier.

Although the invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

With regard to the set of claim, it is to be understood that, although some technical features described in the dependent claims may only be disclosed in combination with the technical features of independent claims, any combination of all technical features described in the entire set of claims is possible and disclosed herein insofar as the skilled person regards this combination as reasonable.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A filter method for identifying from a set of event notifications a filtered set of event notifications, wherein the filtered set of event notifications consists of all event notifications relevant for a query item, the method comprising the steps of:
providing a computer system for running a discovery service, the computer system comprising:
a discovery service database for storing event notifications, the discovery service database stored in a non-transitory machine readable storage medium,
a set of event notifications stored in the discovery service database,
wherein the set of event notifications comprises event notifications generated by entities represented by unique identifiers in a unique identifier network,
wherein the query item and containers are entities,
wherein an aggregation event notification is generated each time an entity is added into a container or deleted from a container,
wherein each aggregation event notification comprises an action, a timestamp, a parent identifier and a child identifier,
wherein each object event notification comprises a timestamp and an object identifier, and
wherein each event notification comprises an event server address to an event server comprising a corresponding event; and
a processor implementing an application logic for identifying from the stored set of event notifications the filtered set of event notifications,
the application logic carrying out the following steps:
creating a filtered list as the filtered set, which is initially empty;
creating a stack, which is initially empty;
pushing the unique identifier of the query item onto the stack; and
repeating the following steps for each event notification of the set in chronological order:
pushing the parent identifier of the current event notification on the stack and adding the current event notification to the filtered list if the current event notification is an aggregation event, and comprises addition as an action, and comprises the topmost unique identifier of the stack as a child identifier;
removing the topmost unique identifier from the stack and adding the current event to the filtered list if the current event notification fulfills predetermined conditions, wherein the predetermined conditions comprise: the current event notification is an aggregation event, and comprises deletion as an action, and comprises the topmost unique identifier of the stack as a parent identifier; and
adding the current event notification to the filtered events list if the current event notification is an object event notification and its object identifier is stored somewhere in the stack.

2. The filter method according to claim 1, wherein the predetermined conditions further comprise: the current event notification further comprises the unique identifier second from the top of the stack as a child identifier.

3. The filter method according to claim 1, wherein the filter method infers the action of the aggregation event from the history of the parent identifier and the child identifier of the aggregation event.

4. A computer system for running a discovery service for identifying from a set of event notifications a filtered set of event notifications, wherein the filtered set of event notifications consists of all event notifications relevant for a query item, the computer system comprising:
- a non-transitory machine-readable medium that implements a discovery service database for storing event notifications;
- a set of event notifications stored in the discovery service database,
  - the set comprising event notifications generated by entities represented by unique identifiers in a unique identifier network,
  - wherein the query item and containers are entities,
  - wherein an aggregation event notification is generated each time an entity is added into a container or deleted from a container,
  - wherein each aggregation event notification comprises an action, a timestamp, a parent identifier and a child identifier,
  - wherein each object event notification comprises a timestamp and an object identifier, and
  - wherein each event notification comprises an event server address to an event server comprising a corresponding event; and
- a processor that implements an application logic for identifying from the stored set of event notifications the filtered set of event notifications by means of a filter method, wherein the application logic for identifying the filtered set is suitable to carry out the following steps:
creating a filtered list as the filtered set, which is initially empty;
creating a stack, which is initially empty;
pushing the unique identifier of the query item onto the stack; and
repeating the following steps for each event notification of the set in chronological order:
  - pushing the parent identifier of the current event notification on the stack and adding the current event notification to the filtered list if the current event notification is an aggregation event, and comprises addition as an action, and comprises the topmost unique identifier of the stack as a child identifier;
  - removing the topmost unique identifier from the stack and adding the current event to the filtered list if the current event notification fulfills predetermined conditions, wherein the predetermined conditions comprise: the current event notification is an aggregation event, and comprises deletion as an action, and comprises the topmost unique identifier of the stack as a parent identifier; and
  - adding the current event notification to the filtered events list if the current event notification is an object event notification and its object identifier is stored somewhere in the stack.

5. The system according to claim 4, wherein the application logic is further suitable for identifying from an original set of event notifications the set of event notifications by means of a search method, wherein the original set is stored in the discovery service database.

\* \* \* \* \*